(12) United States Patent
James et al.

(10) Patent No.: US 7,954,127 B2
(45) Date of Patent: May 31, 2011

(54) DIRECT BROADCAST SIGNAL DISTRIBUTION METHODS

(75) Inventors: Thomas H. James, Pacific Palisades, CA (US); Nathan B. Zerbe, El Segundo, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1345 days.

(21) Appl. No.: 10/255,344

(22) Filed: Sep. 25, 2002

(65) Prior Publication Data
US 2004/0060065 A1 Mar. 25, 2004

(51) Int. Cl.
*H04N 7/18* (2006.01)
(52) U.S. Cl. ............... 725/81; 725/68; 725/71; 725/78
(58) Field of Classification Search .............. 725/68, 725/71
See application file for complete search history.

(56) References Cited

U.S. PATENT DOCUMENTS

| | | | |
|---|---|---|---|
| 3,581,209 A | 5/1971 | Zimmerman |
| 3,670,275 A | 6/1972 | Kalliomaki et al. |
| 4,064,460 A | 12/1977 | Gargini |
| 4,132,952 A | 1/1979 | Hongu et al. |
| 4,354,167 A | 10/1982 | Terreault et al. |
| 4,382,266 A | 5/1983 | Panzer |
| 4,403,343 A | 9/1983 | Hamada |
| 4,509,198 A | 4/1985 | Nagatomi |
| 4,513,315 A | 4/1985 | Dekker et al. |
| 4,530,008 A | 7/1985 | McVoy |
| 4,532,543 A | 7/1985 | Groenewegen |
| 4,538,175 A | 8/1985 | Balbes et al. |
| 4,545,075 A | 10/1985 | Miller et al. |
| 4,556,988 A | 12/1985 | Yoshisato |
| 4,592,093 A | 5/1986 | Ouchi et al. |
| 4,608,710 A | 8/1986 | Sugiura |
| 4,628,506 A | 12/1986 | Sperlich |
| 4,656,486 A | 4/1987 | Turner |
| 4,667,243 A | 5/1987 | Blatter et al. |

(Continued)

FOREIGN PATENT DOCUMENTS

CN 1413021 4/2003

(Continued)

OTHER PUBLICATIONS

International Search Report and Written Opinion dated Feb. 12, 2008 in counterpart International Application No. PCT/US2006/012291 filed Apr. 3, 2006 of U.S. Appl. No. 11/097,723, filed Apr. 1, 2005.

(Continued)

*Primary Examiner* — Christopher Kelley
*Assistant Examiner* — Timothy R Newlin (57) ABSTRACT

A direct broadcast system having a high altitude communication device that transmits broadcast signals, which are received by an antenna, is provided. The system includes an outdoor unit (ODU) electrically coupled to the antenna. The ODU includes a low noise block converter (LNB) that receives and amplifies the broadcast signals. An ODU receiver is electrically coupled to the ODU and selects a desired frequency of the broadcast signals. Integrated receiver and decoders (IRD(s)) are electrically coupled to the ODU receiver via a single distribution cable. The IRD(s) convert the broadcast signals into IRD output signals. Methods of performing the same are also provided, herein, including a transport select method and a service select method for receiving the broadcast signals. A direct broadcast system installation method and wireless communication between the ODU and the IRD(s) are also provided.

18 Claims, 6 Drawing Sheets

U.S. PATENT DOCUMENTS

| | | | |
|---|---|---|---|
| 4,672,687 A | 6/1987 | Horton et al. | |
| 4,675,732 A | 6/1987 | Oleson | |
| 4,710,972 A | 12/1987 | Hayashi et al. | |
| 4,723,320 A | 2/1988 | Horton | |
| 4,761,825 A | 8/1988 | Ma | |
| 4,761,827 A | 8/1988 | Horton et al. | |
| 4,785,306 A | 11/1988 | Adams | |
| 4,802,239 A | 1/1989 | Ooto | |
| 4,805,014 A | 2/1989 | Sahara et al. | |
| 4,813,036 A | 3/1989 | Whitehead | |
| 4,823,135 A | 4/1989 | Hirashima et al. | |
| 4,860,021 A | 8/1989 | Kurosawa et al. | |
| 4,866,787 A | 9/1989 | Olesen | |
| 4,876,736 A | 10/1989 | Kiewit | |
| 4,885,803 A | 12/1989 | Hermann et al. | |
| 4,903,031 A | 2/1990 | Yamada | |
| 4,945,410 A | 7/1990 | Walling | |
| 5,010,400 A | 4/1991 | Oto | |
| 5,027,430 A | 6/1991 | Yamauchi et al. | |
| 5,068,918 A | 11/1991 | Verheijen et al. | |
| 5,073,930 A | 12/1991 | Green et al. | |
| 5,249,043 A | 9/1993 | Grandmougin | |
| 5,276,904 A | 1/1994 | Mutzig et al. | |
| 5,301,352 A | 4/1994 | Nakagawa et al. | |
| 5,437,051 A | 7/1995 | Oto | |
| 5,521,631 A | 5/1996 | Budow et al. | |
| 5,565,805 A | 10/1996 | Nakagawa et al. | |
| 5,572,517 A | 11/1996 | Safadi | |
| 5,574,964 A | 11/1996 | Hamlin | |
| 5,587,734 A | 12/1996 | Lauder et al. | |
| 5,617,107 A | 4/1997 | Fleming | |
| 5,649,318 A | 7/1997 | Lusignan | |
| 5,675,390 A | 10/1997 | Schindler et al. | |
| 5,708,961 A | 1/1998 | Hylton et al. | |
| 5,734,356 A | 3/1998 | Chang | |
| 5,748,732 A | 5/1998 | Le Berre et al. | |
| 5,760,819 A | 6/1998 | Sklar et al. | |
| 5,760,822 A | 6/1998 | Coutinho | |
| 5,787,335 A | 7/1998 | Novak | |
| 5,790,202 A | 8/1998 | Kummer et al. | |
| 5,793,413 A * | 8/1998 | Hylton et al. | 725/81 |
| 5,805,806 A | 9/1998 | McArthur | |
| 5,805,975 A | 9/1998 | Green et al. | |
| 5,835,128 A * | 11/1998 | Macdonald et al. | 725/81 |
| 5,838,740 A | 11/1998 | Kallman et al. | |
| 5,848,239 A | 12/1998 | Ando | |
| 5,864,747 A * | 1/1999 | Clark et al. | 725/67 |
| 5,883,677 A | 3/1999 | Hofmann | |
| 5,886,995 A | 3/1999 | Arsenault et al. | |
| 5,898,455 A | 4/1999 | Barakat et al. | |
| 5,905,941 A | 5/1999 | Chanteau | |
| 5,905,942 A | 5/1999 | Stoel et al. | |
| 5,923,288 A | 7/1999 | Pedlow, Jr. | |
| 5,936,660 A | 8/1999 | Gurantz | |
| 5,959,592 A | 9/1999 | Petruzzelli | |
| 5,970,386 A * | 10/1999 | Williams | 725/69 |
| 5,982,333 A | 11/1999 | Stillinger et al. | |
| 6,005,861 A | 12/1999 | Humpleman | |
| 6,011,597 A | 1/2000 | Kubo | |
| 6,023,603 A | 2/2000 | Matsubara | |
| 6,038,425 A | 3/2000 | Jeffrey | |
| 6,100,883 A | 8/2000 | Hoarty | |
| 6,104,908 A | 8/2000 | Schaffner et al. | |
| 6,134,419 A | 10/2000 | Williams | |
| 6,147,714 A | 11/2000 | Terasawa et al. | |
| 6,173,164 B1 | 1/2001 | Shah | |
| 6,188,372 B1 | 2/2001 | Jackson et al. | |
| 6,192,399 B1 | 2/2001 | Goodman | |
| 6,198,449 B1 | 3/2001 | Muhlhauser et al. | |
| 6,198,479 B1 | 3/2001 | Humpleman et al. | |
| 6,202,211 B1 | 3/2001 | Williams, Jr. | |
| 6,292,567 B1 | 9/2001 | Marland | |
| 6,304,618 B1 | 10/2001 | Hafeez et al. | |
| 6,340,956 B1 | 1/2002 | Bowen et al. | |
| 6,397,038 B1 | 5/2002 | Green, Sr. et al. | |
| 6,424,817 B1 | 7/2002 | Hadden | |
| 6,430,233 B1 | 8/2002 | Dillon et al. | |
| 6,430,742 B1 | 8/2002 | Chanteau | |
| 6,441,797 B1 | 8/2002 | Shah | |
| 6,442,148 B1 | 8/2002 | Adams et al. | |
| 6,452,991 B1 | 9/2002 | Zak | |
| 6,463,266 B1 | 10/2002 | Shohara | |
| 6,486,907 B1 | 11/2002 | Farber et al. | |
| 6,493,873 B1 | 12/2002 | Williams | |
| 6,493,874 B2 | 12/2002 | Humpleman | |
| 6,501,770 B2 | 12/2002 | Arsenault et al. | |
| 6,510,152 B1 | 1/2003 | Gerszberg et al. | |
| 6,549,582 B1 | 4/2003 | Friedman | |
| 6,574,235 B1 | 6/2003 | Arslan et al. | |
| 6,598,231 B1 | 7/2003 | Basawapatna et al. | |
| 6,600,730 B1 | 7/2003 | Davis et al. | |
| 6,600,897 B1 | 7/2003 | Watanabe et al. | |
| 6,622,307 B1 | 9/2003 | Ho | |
| 6,653,981 B2 | 11/2003 | Wang et al. | |
| 6,728,513 B1 | 4/2004 | Nishina | |
| 6,762,727 B2 | 7/2004 | Rochford et al. | |
| 6,864,855 B1 | 3/2005 | Fujita | |
| 6,865,193 B2 | 3/2005 | Terk | |
| 6,879,301 B2 | 4/2005 | Kozlovski | |
| 6,889,385 B1 | 5/2005 | Rakib et al. | |
| 6,906,673 B1 | 6/2005 | Matz et al. | |
| 6,941,576 B2 | 9/2005 | Amit | |
| 6,944,878 B1 | 9/2005 | Wetzel et al. | |
| 7,010,265 B2 | 3/2006 | Coffin, III | |
| 7,016,643 B1 | 3/2006 | Kuether et al. | |
| 7,020,081 B1 | 3/2006 | Tani et al. | |
| 7,039,169 B2 | 5/2006 | Jones | |
| 7,069,574 B1 * | 6/2006 | Adams et al. | 725/68 |
| 7,085,529 B1 | 8/2006 | Arsenault et al. | |
| 7,130,576 B1 * | 10/2006 | Gurantz et al. | 455/3.02 |
| 7,239,285 B2 | 7/2007 | Cook | |
| 7,245,671 B1 | 7/2007 | Chen et al. | |
| 7,257,638 B2 | 8/2007 | Celik et al. | |
| 7,260,069 B2 | 8/2007 | Ram et al. | |
| 7,263,469 B2 | 8/2007 | Bajgrowicz et al. | |
| 7,519,680 B1 | 4/2009 | O'Neil | |
| 7,522,875 B1 | 4/2009 | Gurantz et al. | |
| 7,542,715 B1 | 6/2009 | Gurantz et al. | |
| 7,603,022 B2 | 10/2009 | Putterman et al. | |
| 2001/0055319 A1 | 12/2001 | Quigley et al. | |
| 2002/0044614 A1 | 4/2002 | Molnar | |
| 2002/0140617 A1 | 10/2002 | Luly et al. | |
| 2002/0152467 A1 | 10/2002 | Fiallos | |
| 2002/0154055 A1 | 10/2002 | Davis et al. | |
| 2002/0154620 A1 | 10/2002 | Azenkot et al. | |
| 2002/0178454 A1 | 11/2002 | Antoine et al. | |
| 2002/0181604 A1 | 12/2002 | Chen | |
| 2003/0023978 A1 | 1/2003 | Bajgrowicz | |
| 2003/0129960 A1 | 7/2003 | Kato | |
| 2003/0185174 A1 | 10/2003 | Currivan | |
| 2003/0217362 A1 | 11/2003 | Summers et al. | |
| 2003/0220072 A1 | 11/2003 | Coffin, III | |
| 2004/0064689 A1 | 4/2004 | Carr | |
| 2004/0068747 A1 | 4/2004 | Robertson et al. | |
| 2004/0136455 A1 | 7/2004 | Akhter et al. | |
| 2004/0153942 A1 | 8/2004 | Shtutman et al. | |
| 2004/0161031 A1 | 8/2004 | Kwentus et al. | |
| 2004/0184521 A1 | 9/2004 | Chen et al. | |
| 2004/0192190 A1 | 9/2004 | Motoyama | |
| 2004/0198237 A1 | 10/2004 | Abutaleb et al. | |
| 2004/0203425 A1 | 10/2004 | Coffin | |
| 2004/0214537 A1 | 10/2004 | Bargroff et al. | |
| 2004/0229583 A1 | 11/2004 | Ogino | |
| 2004/0244044 A1 | 12/2004 | Brommer | |
| 2004/0244059 A1 | 12/2004 | Coman | |
| 2004/0255229 A1 | 12/2004 | Shen et al. | |
| 2004/0261110 A1 | 12/2004 | Kolbeck et al. | |
| 2005/0002640 A1 | 1/2005 | Putterman et al. | |
| 2005/0033846 A1 | 2/2005 | Sankaranarayan et al. | |
| 2005/0052335 A1 | 3/2005 | Chen | |
| 2005/0054315 A1 | 3/2005 | Bajgrowicz et al. | |
| 2005/0057428 A1 | 3/2005 | Fujita | |
| 2005/0060525 A1 | 3/2005 | Schwartz, Jr. et al. | |
| 2005/0066367 A1 | 3/2005 | Fyke et al. | |
| 2005/0071882 A1 | 3/2005 | Rodriguez et al. | |
| 2005/0118984 A1 | 6/2005 | Akiyama | |
| 2005/0138663 A1 | 6/2005 | Throckmorton et al. | |

| | | | |
|---|---|---|---|
| 2005/0184923 | A1 | 8/2005 | Saito et al. |
| 2005/0190777 | A1 | 9/2005 | Hess et al. |
| 2005/0193419 | A1 | 9/2005 | Lindstrom et al. |
| 2005/0198673 | A1 | 9/2005 | Kit |
| 2005/0204388 | A1 | 9/2005 | Knudson et al. |
| 2005/0229206 | A1 | 10/2005 | Pugel et al. |
| 2005/0240969 | A1 | 10/2005 | Sasaki et al. |
| 2005/0264395 | A1 | 12/2005 | Bassi |
| 2005/0289605 | A1 | 12/2005 | Jeon |
| 2006/0018345 | A1 | 1/2006 | Nadarajah et al. |
| 2006/0030259 | A1 | 2/2006 | Hetzel et al. |
| 2006/0041912 | A1 | 2/2006 | Kuhns |
| 2006/0080707 | A1 | 4/2006 | Laksono |
| 2006/0133612 | A1 | 6/2006 | Abedi et al. |
| 2006/0174282 | A1 | 8/2006 | Dennison et al. |
| 2006/0225104 | A1 | 10/2006 | James et al. |
| 2006/0259929 | A1 | 11/2006 | James et al. |
| 2006/0294512 | A1 | 12/2006 | Seiden |
| 2007/0083898 | A1 | 4/2007 | Norin et al. |
| 2007/0202800 | A1 | 8/2007 | Roberts et al. |
| 2008/0064355 | A1 | 3/2008 | Sutskover et al. |
| 2009/0013358 | A1 | 1/2009 | Throckmorton et al. |
| 2009/0150937 | A1 | 6/2009 | Ellis et al. |
| 2009/0222875 | A1 | 9/2009 | Cheng et al. |
| 2009/0252316 | A1 | 10/2009 | Ratmanski et al. |

FOREIGN PATENT DOCUMENTS

| | | |
|---|---|---|
| DE | 197 49 120 | 6/1999 |
| DE | 10155481 | 5/2003 |
| EP | 0 288 928 | 11/1988 |
| EP | 1207688 | 5/2002 |
| EP | 1331810 | 7/2003 |
| EP | 1447987 A1 | 8/2004 |
| FR | 2861939 | 5/2005 |
| GB | 2 127 257 | 4/1984 |
| GB | 2354650 | 3/2001 |
| JP | 57193190 | 11/1982 |
| JP | 59-211380 | 11/1984 |
| JP | 60153225 | 8/1985 |
| JP | 60165832 | 8/1985 |
| JP | 61195094 | 8/1986 |
| JP | 61238130 | 10/1986 |
| JP | 62026933 | 2/1987 |
| JP | 62-279785 | 12/1987 |
| JP | 62279785 | 12/1987 |
| JP | 63-016734 | 1/1988 |
| JP | 63059233 | 3/1988 |
| JP | 02054637 | 8/1988 |
| JP | 63202136 | 8/1988 |
| JP | 2140022 A2 | 11/1988 |
| JP | 63309032 | 12/1988 |
| JP | 01-255389 | 10/1989 |
| JP | 01-256823 | 10/1989 |
| JP | 02140022 | 5/1990 |
| JP | 02209026 | 8/1990 |
| JP | 03058521 | 3/1991 |
| JP | 2001-231033 | 2/2000 |
| JP | 2001237752 | 8/2001 |
| JP | 2003-339030 | 11/2003 |
| WO | WO 97/19554 | 5/1997 |
| WO | 0150290 | 7/2001 |
| WO | WO 01/56297 | 8/2001 |
| WO | 02082351 A1 | 10/2002 |
| WO | 03026187 | 3/2003 |
| WO | WO 03/094520 | 11/2003 |
| WO | 2004054128 | 6/2004 |
| WO | WO 2004/105283 | 12/2004 |
| WO | 2005094075 | 10/2005 |
| WO | WO 2005/114879 | 12/2005 |
| WO | 2006015186 | 2/2006 |
| WO | 2006017218 | 2/2006 |
| WO | WO 2006/026477 | 3/2006 |

OTHER PUBLICATIONS

International Search Report and Written Opinion dated Jan. 8, 2008 in counterpart International Application No. PCT/US06/12302 filed Apr. 30, 2006 of U.S. Appl. No. 11/097,480, filed Apr. 1, 2005.

International Search Report and Written Opinion dated Aug. 31, 2007 in counterpart International Application No. PCT/US06/12308 filed Apr. 3, 2006 of U.S. Appl. No. 11/097,615, filed Apr. 1, 2005.

International Search Report and Written Opinion dated Aug. 17, 2007 in counterpart International Application No. PCT/US06/12305 filed Apr. 3, 2006 of U.S. Appl. No. 11/097,482, filed Apr. 1, 2005.

International Search Report and Written Opinion dated Sep. 20, 2007 in counterpart International Application No. PCT/US06/12309 filed Apr. 3, 2006 of U.S. Appl. No. 11/097,479, filed Apr. 1, 2005.

International Search Report and Written Opinion dated Sep. 20, 2007 in counterpart International Application No. PCT/US06/12303 filed Apr. 3, 2006 of U.S. Appl. No. 11/097,724, filed Apr. 1, 2005.

International Search Report and Written Opinion dated Aug. 14, 2007 in counterpart International Application No. PCT/US06/12306 filed Apr. 3, 2006 of U.S. Appl. No. 11/097,481, filed Apr. 1, 2005.

International Search Report and Written Opinion dated Aug. 15, 2007 in counterpart International Application No. PCT/US06/12304 filed Apr. 3, 2006 of U.S. Appl. No. 11/097,626, filed Apr. 1, 2005.

International Search Report and Written Opinion dated Feb. 2, 2007 in counterpart International Application No. PCT/US2006/033558 filed Aug. 30, 2006 of U.S. Appl. No. 11/219,418, filed Sep. 2, 2005.

International Search Report and Written Opinion dated Feb. 28, 2007 in counterpart International Application No. PCT/US2006/033853 filed Aug. 30, 2006 of U.S. Appl. No. 11/219,407, filed Sep. 2, 2005.

International Search Report and Written Opinion dated Mar. 1, 2007 in counterpart International Application No. PCT/US2006/033857 filed Aug. 30, 2006 of U.S. Appl. No. 11/219,247, filed Sep. 2, 2005.

EUTELSAT; "Digital Satellite Equipment Control, Bus Functional Specification"; Bus Functional Specification; Paris, France; Feb. 25, 1998; XP002348247; entire document.

Mussino, F., "Reception and distribution techniques for DBS signals in community antenna installations," Accession No. 2781941, Alta Frequenza, 55(2):105-11, Mar.-Apr. 1986—Abstract Only.

Mussino, F., "Evolution of the receiving and distribution installations of television signals: from terrestrial broadcasting to satellite broadcasting,"Accession No. 2742699, Proc. Of the $32^{nd}$ Congress on Electronics: Satellite Broadcasting, 243-50, 1985—Abstract Only.

Mussino, F., "The reception of direct broadcast satellite TV signals in the 12 GHz band, using the C-MAC packet system,"Accession No. 2325813, Elettronica e Telecomunicazioni, 33(3):117-30, May-Jun. 1984—Abstract Only.

Mussino, F., "Centralized aerial systems [cable TV]," Accession No. 2306051, Radioindustria Elettronica—Televizione, 7(11):491-4, Nov. 1983—Abstract Only.

Chaplin, J.G., et al., "Satellite broadcast reception: the FM approach to signal distribution in individual and community antenna systems," Accession No. 2241798, EBU Review, Technical No. 202:274-81, Dec. 1983—Abstract Only.

Mussino, F., "Cabled distribution systems: wide-band and channelized reception methods,"Accession No. 2207325, Elettronica e Telecomunicazoni, 32(5):229-33, Sep.-Oct. 1983—Abstract Only.

Mussino, F., "Intermodulation characteristics of the television broadcast satellite receivers,"Accession No. 2095285, Alta Frequenza 52(2):118-25, Mar.-Apr. 1983,—Abstract Only.

Mussino, F., "Some problems of television reception," Accession No. 1850235, Elettronica e Telecomunicazioni, 30(4):165-70, Jul.-Aug. 1981, Abstract Only.

Bava, G. et al., "Characteristics and structure of receivers for direct TV radiodiffusion by satellite in the 12 GHz band," Accession No. 1512676, Alta Frequenza, 48(12):714-25, Dec. 1979, Abstract Only.

Mussino, F., "Synchronous demodulator for television signals," Accession No. 1497282, Elettronica e Telecomunicazioni, 28(3):101-7, May-Jun. 1979, Abstract Only.

Mussino, F., "Windscreen antenna," Accession No. 1315746, Alta Frequenza, 47(10):720-7, Oct. 1978, Abstract Only.

Mussino, F., "Characteristics and problems with centralised antennae," Accession No 1290455, Radioindustria Elettronica—Televizione 4:203-8, Apr. 1978, Abstract Only.

Mussino, F., "EMC measurements on the electrical equipment of cars," Accession No. 1117953, $2^{nd}$ symposium technical exhibition on electromagnetic compatibility, 131-3, 1977, Abstract Only.

Mussino, F., "RF impedance of the electrical network of cars," Accession No. 1000748, International Symposium on Electromagnetic Compatibility, 418-23, 1976, Abstract Only.

Beccari, C. et al, "All-pass networks with constant phase difference," Accession No. 980800, Elettronica e Telecomunicazioni, 25(3):117-22, May-Jun. 1976, Abstract Only.

Mussino, F., "Measuring methods for CATV systems proposed by IEC," Accession No. 945815, Elettronica e Telecomunicazioni, 25(1):29-34, Jan.-Feb. 1976, Abstract Only.

Mussino, F., "Characteristics of CATV systems proposed by IEC," Accession No. 909134, Elettronica e Telecomunicazioni, 24(6):243-5, Nov.-Dec. 1975, Abstract Only.

Mussino, F., "Antenna amplifier for field strength measurements on wide frequency band," Accession No. 544273, Elettronica e Telecomunicazioni, 22(2):49-52, Mar.-Apr. 1973, Abstract Only.

Mussino, F., "FM receiver with coherent demodulation," Accession No. 320402, Elettronica e Telecomunicazioni, 20(4):133-7, 1971, Abstract Only.

Mussino, F., "Coherent detection receivers for radio and television broadcasting," Accession No. 273689, Elettronica e Telecomunicazioni, 20(2):57-69, Mar.-Apr. 1971, Abstract Only.

Mussino, F. et al., "Stereophonic transmission system using double carrier modulation," Accession No. 208381, Proceedings of the 17$^{th}$ international congress on electronics, 415-21, 1970, Abstract Only.

Mussino, F., "A means of continuously varying phase," Accession No. 89438, Elettronica e Telecomunicazioni, 18(4):118-24, Jul. 1969, Abstract Only.

Carrillo, J.A. et al., "Stereophonic reception noise figure of 'pilot frequency' systems,"Accession No. 22497, Elettronica e Telecomunicazioni, 17(5):162-6, Sep. 1968, Abstract Only.

Di Zenobio, D. et al., "A switching circuit scheme for a satellite site diversity system," Accession No. 3316999, 1988 IEEE International Symposium on Circuits and Systems Proceedings (Cat. No. 88CH2458-8), 1:119-22, Abstract Only.

Holtstiege, H., "Satellite reception-tips and tricks of an expert," Accession No. 3132408, Funkschau, 4:57-8, 61-2, Feb. 12, 1988, Abstract Only.

Cominetti, M. et al., "Distribution of DBS signals of the MAC-family in collective antenna systems," Accession No. 3117800, New Systems and Services in Telecommunications, III: Networks, Cables, Satellites—The What, the How, the Why? Proceedings of the Third International Conference: 417-25, 1987, Abstract Only.

O'Neill, H.J. et al., "The distribution of C-MAC in cable systems," Accession No. 2856976, Cable Television Engineering, 13(7):294-301, Dec. 1986, Abstract Only.

Loweli, R.R. et al., "NASA's communication program examined for the 1980s and 1990s. I," Accession No. 2801869, MSN Microwave Systems News & Communications Technology, 16(9):79-81, 83-5, 87-8, 90, Aug. 1986, Abstract Only.

Kudsia, C.M. et al., "RF channel characteristics and enhanced performance in future DBS satellites at 12 GHz in Region 2," Accession No. 2759373, AIAA 11$^{th}$ Communication Satellite Systems Conference. Collection of Technical Papers: 220-4, 1986, Abstract Only.

Baker, S., "Eutelsat in the 90s," Accession No. 2569799, Cable & Satellite Europe, 7:9-12, Jul. 1985, Abstract Only.

Hessenmuller, H., "The progress towards a unified colour television standard for satellite broadcasting in Europe," Accession No. 2569494, Fernmelde-Ingenieur, 39(8):1-36, Aug. 1985, Abstract Only.

Sultan, N. et al., "Reconfigurable dual feed antenna for direct broadcast satellites,"Accession No. 2496781, Acta Astronautica, 12(1):27-35, Jan. 1985, Abstract Only.

Gandy, C., "Antenna requirements and design options for DBS domestic reception,"Accession No. 2358182, IBC 84. International Broadcasting Convention (Proceedings No. 240): 251-3, 1984, Abstract Only.

Renton, C., "RCA satcom Ku-band antenna system," Accession No. 2867860, AP-S International Symposium 1986. 1986 International Symposium Digest Antennas and Propagation (Cat. No. 86CH2325-9) 1:157-60, 1986, Abstract Only.

Sultan, N. et al., "A reconfigurable multiple shaped beam reflector antenna for direct broadcast satellite," Accession No. 2079246, Third International Conference on Antennas and Propagation ICAP 83: 203-7, pt. 1, 1983, Abstract Only.

Palumbo, B., "Dual polarized two-frequence slot array for a satellite electronically despun antenna," Accession No. 184451, 1969 European microwave conference: 147, 1970, Abstract Only.

Lenormand, R. et al., "CAD for HERMES antennas," Accession No. 3317368, AP-S Intenational Symposium 1988. 1988 International Symposium Digest: Antennas and Propagation (Cat. No. 88CH2563-5): 1:26-9, 1988, Abstract Only.

Naderi, F.M., "ACTS: the first step toward a switchboard in the sky," Accession No. 3190134, Telematics and Informatics, 5(1):13-20, 1988, Abstract Only.

Noda, H. et al., "Satellite TV receiving system," Accession No. 3152051, JRC Review, 26:45-50, 1988, Abstract Only.

Binder, R. et al., "The multiple satellite system-low altitude survivable communications,"Accession No. 3095999, MILCOM 87: 1987 IEEE Military Communications Conference 'Crisis Communications: The Promise and Reality'. Conference Record (Cat. No. 87CH2493-5), 2:620-5, 1987, Abstract Only.

Hori, T. et al., "Electronically steerable spherical array antenna for mobile earth station," Accession No. 2935203, Fifth International Conference on Antennas and Propagation (ICAP 87) (Conf. Publ. No. 274), 1:55-8, 1987, Abstract Only.

Yamamoto, H. et al., "Communications equipment for multibeam satellites," Accession No. 2727289, Telecommunication technologies 1985/1986: 109-18, 1985, Abstract Only.

Thurl, W. et al., "Satellite receiving station for TV programme distribution," Accession No. 2480868, Mikrowellen Magazin, 10(6):604-6, Dec. 1984, Abstract Only.

Alaria, G.B. et al., "SS/TDMA satellie system with on board TST switching stage," Accession No. 2342421, CELT Rapporti Tecnici, 12(3):247-55, Jun. 1984, Abstract Only.

Kudrna, K., "Preliminary test results of the electronic switching spherical array antenna," Accession No. 2324225, ITC/USA/'83. International Telemetering Conference: 11-17, 1983, Abstract Only.

Vidal Saint-Andre, B. et al., "A multi-element primary feed system and associated switch device designed for TDMA communication satellites," Accession No. 2290842, Annales des Telecommunications, 39(1-2):76-83, Jan.-Feb. 1984, Abstract Only.

Bongiovanni, G., et al., "Optimal switching algorithm for multibeam satellite systems with variable bandwidth beams," Accession No. 2258153, IBM Technical Disclosure Bulletin, 26(8):4344-8, Jan. 1984, Abstract Only.

Saint-Andre, B.V., et al., "A multi-element primary feed system and associated switch device designed for TDMA communication satellites," Accession No. 2257271, GLOBECOM '83. IEEE Global Telecommunications Conference. Conference Record: 3:1645-9, 1983, Abstract Only.

Spisz, E.W., "NASA development of a satellite switched SS-TDMA IF switch matrix," Accession No. 2241614, CECON '83 Record: Cleveland Electrical/Electronics Conference and Exposition 1983: 19-27, Nov. 1983, Abstract Only.

Kudrna, K. et al., "The Electronica Switching Spherical Array (ESSA) antenna for the Earth Radiation Budget Spacecraft (ERBS)," Accession No. 2148187, ITC/USA/'82. International Telemetering Conference, 271-88, 1982, Abstract Only.

Kumagai, H. et al., "20 GHz band receiving facilities at sub-earth-station for CS site diversity switching experiments," Accession No. 2147104, Review of the Radio Research Laboratories, 28(147):553-60, Sep. 1982, Abstract Only.

Kennedy, W.A., "UHE airborne satcom antenna systems," Accession No. 2111199, Midcon/80 Conference Record: 8/1/1-6, 1980, Abstract Only.

Grant, I. et al., "The Skyswitch project," Accession No. 2111056, Telecommunications, 17(1):80, 88, Jan. 1983, Abstract Only.

King-Tim, Ko et al., "A space-division multiple-access protocol for spot-beam antenna and satellite-switched communication network," Accession No. 2079577, IEEE Journal on Selected Areas in Communications, vol. SAC-1, No. 1:126-32, Jan. 1983, Abstract Only.

Farrell, P.G., "Modulation and coding," Accession No. 2464817, International Journal of Satellite Communications, 2(4):287-304, Oct.-Dec. 1984, Abstract Only.

Beach, M.A. et al., "An adaptive antenna array for future land mobile satellite terminals," Accession No. 3416971, Sixth International Conference on Antennas and Propagation (ICAP 89) (Conf. Publ. No. 301), 1:326-30, 1989, Abstract Only.

Johannsen, K.G., "Ground station tracking of dual linearly polarized satellites," Accession No. 922037, IEEE Transactions on Aerospace and Electronic Systems, vol. AED-11, No. 6: 1333-45, Nov. 1975, Abstract Only.

Harvey, R.V., "Simplifying the planning of frequency assignments for satellite broadcasting," Accession No. 1069917, EBU Review, Technical 159:218-26, Oct. 1976, Abstract Only.

Nakagawa, M., "Satellite broadcasting in Japan," Accession No. 3473565, AEU 3:50-3, 1989, Abstract Only.

Vuong, X.T. et al., "Some practical strategies for reducing intermodulation in satellite communications," Accession No. 3401833, IEEE Transactions on Aerospace and Electronica Systems, 24(6):755-65, Nov. 1988, Abstract Only.

Poulton, G.T. et al., "Earth-station antennas for multiple satellite access," Accession No. 3352237, Journal of Electrical and Electronics Engineering, Australia, 8(3):168-76, Sep. 1988, Abstract Only.

Alper, A.T., "Capacity allocation in a multi-transponder communications satellite with a common reconfigurable multiple-beam antenna," Accession No. 1790796, IEEE 1981 International Conference on Communications, 54.5/1-5, vol. 3, 1981, Abstract Only.

Matsushita, M. et al., "Some considerations on achieving optimum receiving systems for satellite broadcasting," Accession No. 306770, Proceedings of the 8th international symposium on space technology and science, 719-25, 1969, Abstract Only.

Lewis, V., "SMATV-Phase 1-updating MATV systems (UK)," Electronic Technology 23(1):10-15, Jan. 1989, Abstract Only.

Keen, K.M. et al., "Techniques for the measurement of the cross-polarisation radiation patterns of linearly polarised, polarisation-diversity satellite ground-station antennas," Accession No. 1933335, IEE Proceedings H (Microwaves, Optics and Antennas) 129(3):103-8, Jun. 1982, Abstract Only.

Difonzo, D.F., "Antennas: Key to communications satellite growth," Accession No. 1279523, Microwave Systems News 8(6):83-5, 87, 90-1, Jun. 1, 1978, Abstract Only.

Dement, D.K., "NASA's revitalized role in satellite communications," Acession No. 152793, IEEE Communications Magazine, 18(1):37-41, Jan. 1980, Abstract Only.

Kalliomaki, K. et al., "Electronically tracking antenna system for satellite reception," Acession No. 150587, IEEE Tranactions on Aerospace and Electronic Systems, vol. AES-6, No. 3:405-7, May 1970, Abstract Only.

Inoue, T. et al., "30/20 GHz band SCPC satellite communication using small earth stations," Acession No. 2191343, IEEE Journal on Selected Areas in Communications, vol. SAC-1, No. 4:600-8, Sep. 1983, Abstract Only.

Jacobs, I.M. et al., "Trends in military satellite communication networks," Acession No. 1611408, AIAA 8th Communications Satellite Systems Conference 762-5, 1980, Abstract Only.

Davies, R. et al., "Packet communications in satellites with multiple-beam antennas and signal processing," Acession No. 1611382, AIAA 8th Communications Satellite Systems Conference, 378-85, 1980, Abstract Only.

Raymond, H.G. et al., "An advanced mixed user domestic satellite system architecture," Acession No. 1611364, AIAA 8th Communications Satellite Systems Conference, 148-53, 1980, Abstract Only.

Pennoni, G. et al. "An SS-TDMA satellite system incorporating an onboard time/space/time switching facility: overall system characteristics and equipment description," Links for the Future Science, System & Services for Communications. Proceedings of the International Conference on Communications-ICC 84, 2:800-6, 1984, Abstract Only.

Mussino, F., "The Reception of Direct Broadcast Satellite TV Signals in the 12 GHz Band, Using the C-Mac Packet System," Electronics and Telecommunications, 3:117-130, 1984.

Greborio, G.B., "Direct Satellite Television: Distribution System for New Centralized Antenna Installations," Electronics and Telecommunications, 6:271-284, 1984.

Chaplin, J.G. et al., "Satellite broadcast reception: the FM approach to signal distribution in individual and community antenna systems," EBU Review, Technical No. 202, Dec. 1983, 11 pgs.

Sharifi, M.H. et al., "A Multiple Access Technique for Centralized Multiple Satellite networking with On-Board Processing in the Central Node," IEEE, 1012-1021, 1988.

Schmidt, R.L. et al., "Transmission of Two NTSC Color Television Signals Over a Single Satellite Transponder Via Time-Frequency Multiplexing," IEEE Transactions on Communications, vol. Com-31, 11:1257-1266, Nov. 1983.

Pfund, E.T., "Direct Television Broadcasting with a Medium-Size Satellite," IEEE, 121-129, 1988.

Lee, L.-S., "A Polarization Control System for Satellite Communications with Multiple Uplinks," IEEE Transactions on Communications, vol. Com-26, No. 8, 1201-1211, Aug. 1978.

Naderi, F.M., "Advance Satellite Concepts for Future Generation VSAT Networks," IEEE Communications Magazine, Sep. 13-22, 1988.

Granlund, J. et al., "Diversity Combining for Signals of Different Medians," IRE Transactions on Communications Systems, 138-145, 1961.

Davies, P.G. et al., "Measurements of SIRIO Transmissions near 11.6 GHz at Slough (UK),"Alta Frequenza, 332-158 E-338-164 E, 1979.

Chakraborty, D., "Survivable Communication Concept Via Multiple Low Earth-Orbiting Satellites," IEEE Transactions on Aerospace and Electronic Systems, 25(6):879-889, Nov. 1989.

Buntschuh, R.F., "First-Generation RCA Direct Broadcast Satellites," IEEE Journal on Selected Areas in Communications, vol. SAC-3, No. 1, 126-134, Jan. 1985.

Bridle, M., "Satellite Broadcasting in Australia," IEEE Transactions on Broadcasting, vol 34, No. 4, 425-429, Dec. 1988.

Bertossi, A.A. et al., "Time Slot Assignment in SS/TDMA Systems with Intersatellite Links," IEEE Transactions on Communications, vol. Com-35, No. 6, 602-608, Jun. 1987.

Gregorio, G.B., "Direct Satellite Television: Distribution System for New Centralized Antenna Installations," Electronics and Telecommunications, No. 6, 271-284, 1984.

Mussino, F., "The Reception of Direct Broadcast Satellite TV Signals in the 12 GHz Band, Using the 'C-MAC Packet System'," Electronics and Telecommunications, No. 3, 117-130, 1984.

Mussino, F., "Reception and Distribution Techniques for DBS Signals in Community Antenna Installations," Dipartimento di Elettronica—Politecnico di Torino, vol. LV-N.2, 105-111, Mar.-Apr. 1986.

Stephens, G.M., "European DBS: On the Brink," Satellite Communications, Jul. 1988.

Weinberg, A., "On the Passage of High-Level Pulsed Radio Frequency Interference Through a Nonlinear Satellite Transponder," IEEE Transactions on Communications, vol. Com-32, No. 1, Jan. 13-24, 1984.

Tasaka, S., "The SRUC Protocol for Satellite Packet Communication—A Performance Analysis," IEEE Transactions on Communications, vol. Com-34, No. 9, 937-945, Sep. 1986.

Seth, A.K., "Satellite Communication Experiments in the Country," J. Instn. Electronics & Telecom. Engrs., 28(5):199-207, 1982.

Saleh, A.A.M. et al., "Distributed Antennas for Indoor Radio Communications," IEEE Transactions on Communications, vol. Com-35, No. 12, 1245-1251, Dec. 1987.

Jeruchim, M.C., "On the Application of Importance Sampling to the Simulation of Digital Satellite and Multihop Links," IEEE Transactions on Communications, vol. Com-32, No. 10, 1088-1104, Oct. 1984.

Kavehrad, M., "Direct-Sequence Spread Spectrum with DPSK Modulation and Diversity for Indoor Wireless Communications," IEEE Transactions on Communications, vol. Com-35, No. 2, 224-241, Feb. 1987.

Mosely, J. et al., "A Class of Efficient Contention Resolution Algorithms for Multiple Access Channels," IEEE Transactions on Communications, vol. Com-33, No. 2, 145-151, Feb. 1985.

Jain, C.L. et al., "A Direct Reception System for Time Synchronization Via InSat-1" J. Instn. Electronics & Telecom. Engrs, 27(10):470-476, 1981.

Gopal, I.S., et al., "Scheduling in Multibeam Satellites with Interfering Zones," IEEE Transactions on Communications, vol. Com-31, No. 8, 941-951, Aug. 1983.

Gopal, I.S. et al., "Point-to-Multipoint Communication Over Broadcast Links," IEEE Transactions on Communications, vol. Com-32, No. 9, 1034-1049, Sep. 1984.

Gole, P. et al., "Effect of Ice-Induced Cross-Polarization on Digital Earth-Space Links," IEEE Transactions on Communications, vol. Com-32, No. 1, 70-81, Jan. 1984.

Jacobs, I.M. et al., "Trends in Military Satellite Communication Networks," American Institute of Aeronautics and Astronautics, Inc., 762-765, 1980.

Glance, B. et al., "Frequency-Selective Fading Effects in Digital Mobile Radio with Diversity Combining," IEEE Transactions on Communications, vol. Com-31, No. 9, 1085-1094, Sep. 1983.

Cox, D.C., "Antenna Diversity Performance in Mitigating the Effects of Portable Radiotelephone Orientation and Multipath Propagation," IEEE Transactions on Communications, vol. Com-31, No. 5, 620-628, May 1983.

Cimini, Jr., L.J., "Analysis and Simulation of a Digital Mobile Channel Using Orthogonal Frequency Division Multiplexing," IEEE Transactions on Communications, vol. Com-33, No. 7, 665-675, Jul. 1985.

Cartledge, J.C., "Outage Performance of QAM Digital Radio Using Adaptive Equalization and Switched Space Diversity Reception," IEEE Transactions on Communications, vol. Com-35, No. 2, 166-180, 1987.

Mussino, F., "Reception and Distribution Techniques for DBS Signals in Community Antenna Installations," Dipartimento di Elettronica—Politecnico di Torino, vol. LV—N.2, 105-111, Mar.-Apr. 1986.

Muller, Klaus; "DisEqC-controlled Sat-Installations"; RFE Radio Fernsehen Elektronik; Huss Medien GMBH; Berlin, Germany; vol. 46, No. 5; May 1997; pp. 42-44; XP000731482.

Non-final Office Action dated Oct. 27, 2008 in U.S. Appl. No. 11/097,481, filed Apr. 1, 2005 by Thomas H. James et al.

Non-final Office Action dated Oct. 28, 2008 in U.S. Appl. No. 11/097,625, filed Apr. 1, 2005 by Thomas H. James et al.

Non-final Office Action dated Nov. 13, 2008, in U.S. Appl. No. 10/213,383, filed Apr. 15, 2002 by Robert Davis et al.

Non-final Office Action dated Jun. 27, 2008 in U.S. Appl. No. 11/219,407, filed Sep. 2, 2005 by Thomas H. James et al.

Non-final Office Action dated Jun. 27, 2008 in U.S. Appl. No. 11/219,247, filed Sep. 2, 2005 by Thomas H. James et al.

Non-final Office Action dated Feb. 22, 2008 in U.S. Appl. No. 10/123,383, filed Apr. 15, 2002 by Robert Davis et al.

Final Office Action dated Aug. 5, 2008 in U.S. Appl. No. 10/123,383, filed Apr. 15, 2002 by Robert Davis et al.

Non-final Office Action dated Oct. 1, 2008 in U.S. Appl. No. 11/097,482, filed Apr. 1, 2005 by Thomas H. James et al.

Non-final Office Action dated Sep. 4, 2008 in U.S. Appl. No. 11/097,479, filed Apr. 1, 2005 by Thomas H. James et al.

Non-final Office Action dated Oct. 3, 2008 in U.S. Appl. No. 11/097,723, filed Apr. 1, 2005 by Thomas H. James et al.

EPO Communication dated Sep. 22, 2008 in European Application No. 06802627.7 filed Aug. 30, 2006 by Thomas James et al.

Non-final Office Action dated Oct. 9, 2008 in U.S. Appl. No. 11/097,724, filed Apr. 1, 2005 by Thomas H. James et al.

Non-final Office Action dated Oct. 15, 2008 in U.S. Appl. No. 11/097,615, filed Apr. 1, 2005 by Thomas H. James et al.

Non-final Office Action dated Oct. 15, 2008 in U.S. Appl. No. 11/097,480, filed Apr. 1, 2005 by Thomas H. James et al.

Non-final Office Action dated Dec. 24, 2008 in U.S. Appl. No. 11/219,407, filed Sep. 2, 2005 by Thomas H. James et al.

Non-final Office Action dated Dec. 23, 2008 in U.S. Appl. No. 11/219,247, filed Sep. 2, 2005 by Thomas H. James et al.

Non-final Office Action dated Feb. 24, 2009 in U.S. Appl. No. 11/097,479, filed Apr. 1, 2005 by Thomas H. James et al.

Final Rejection dated Mar. 13, 2009 in U.S. Appl. No. 11/097,6482, filed Apr. 1, 2005 by Thomas H. James et al.

Final Rejection dated Mar. 18, 2009 in U.S. Appl. No. 11/097,723, filed Apr. 1, 2005 by Thomas H. James et al.

Final Rejection dated Apr. 1, 2009 in U.S. Appl. No. 11/097,625, filed Apr. 1, 2005 by Thomas H. James et al.

Final Rejection dated Apr. 1, 2009 in U.S. Appl. No. 11/097,724, filed Apr. 1, 2005 by Thomas H. James et al.

Final Rejection dated Mar. 31, 2009 in U.S. Appl. No. 11/097,481, filed Apr. 1, 2005 by Thomas H. James et al.

Final Rejection dated Apr. 6, 2009 in U.S. Appl. No. 11/097,615, filed Apr. 1, 2005 by Thomas H. James et al.

Final Rejection dated Apr. 23, 2009 in U.S. Appl. No. 11/097,480, filed Apr. 1, 2005 by Thomas H. James et al.

Non-final Office Action dated Jun. 26, 2009 in U.S. Appl. No. 11/219,418, filed Sep. 2, 2005 by Thomas H. James et al.

Final Rejection dated May. 27, 2009 in U.S. Appl. No. 10/123,383, filed Apr. 15, 2005 by Robert Davis et al.

Final Rejection dated Jul. 1, 2009 in U.S. Appl. No. 11/219,407, filed Sep. 2, 2005 by Thomas H. James et al.

Final Rejection dated Jul. 28, 2009 in U.S. Appl. No. 11/219,247, filed Sep. 2, 2005 by Thomas H. James et al.

Non-Final Office Action dated Aug. 17, 2009 in U.S. Appl. No. 11/097,615, filed Apr. 1, 2005 by Thomas H. James et al.

Non-Final Office Action dated Aug. 19, 2009 in U.S. Appl. No. 11/097,482, filed Apr. 1, 2005 by Thomas H. James et al.

Non-Final Office Action dated Sep. 14, 2009 in U.S. Appl. No. 11/097,480, filed Apr. 1, 2005 by Thomas H. James et al.

Final Rejection dated Aug. 20, 2009 in U.S. Appl. No. 11/097,723, filed Apr. 1, 2005 by Thomas H. James et al.

Non-Final Office Action dated Aug. 20, 2009 in U.S. Appl. No. 11/097,723, filed Apr. 1, 2005 by Thomas H. James et al.

Non-Final Office Action dated Sep. 28, 2009 in U.S. Appl. No. 11/097,625, filed Apr. 1, 2005 by Thomas H. James et al.

Final Rejection dated Mar. 1, 2010, in U.S. Appl. No. 11/097,723, filed Apr. 1, 2005 by Thomas H. James et al.

Final Rejection dated Mar. 2, 2010, in U.S. Appl. No. 11/097,482, filed Apr. 1, 2005 by Thomas H. James et al.

International Search Report and Written Opinion dated Apr. 23, 2010 in International Application No. PCT/US2010/020246 filed Jan. 6, 2010 by Robert F. Popoli.

Final Rejection dated Apr. 8, 2010 in U.S. Appl. No. 11/810,774, filed Jun. 7, 2007 by Hanno Basse et al.

Non-final Office action dated Oct. 16, 2009 in U.S. Appl. No. 11/810,774, filed Jun. 7, 2007 by Hanno Basse et al.

International Search Report and Written Opinion dated Dec. 30, 2008 in International Application No. PCT/US2007/013418 filed Jun. 7, 2007 by Hanno Basse et al.

International Search Report and Written Opinion dated Dec. 30, 2008 in International Application No. PCT/US2007/014234 filed Jun. 19, 2007 by Thomas H. James et al.

Final Rejection dated Apr. 26, 2010 in U.S. Appl. No. 11/820,205, filed Jun. 18, 2007 by Hanno Basse et al.

EPO Communication dated Feb. 4, 2010 in European Patent Application No. 07809643.5 filed Jun. 18, 2007 by Hanno Basse et al.

Non-final Office action dated Oct. 26, 2009 in U.S. Appl. No. 11/820,205, filed Jun. 18, 2007 by Hanno Basse et al.

EPO Communication dated Mar. 23, 2010 in European Patent Application No. 08767915.5 filed May 28, 2008 by John L. Norin.

International Search Report and Written Opinion dated Dec. 18, 2008 in International Application No. PCT/US2008/006750 filed May 28, 2008 by John L Norin.

Final Rejection dated Apr. 1, 2010 in U.S. Appl. No. 11/097,625, filed Apr. 1, 2005 by Thomas H. James et al.

Final Rejection dated Mar. 29, 2010 in U.S. Appl. No. 11/097,480, filed Apr. 1, 2005 by Thomas H. James et al.

Final Rejection dated Dec. 24, 2009 in U.S. Appl. No. 11/219,418, filed Sep. 2, 2002 by Thomas H. James et al.

Non-final Office action dated Dec. 22, 2009 in U.S. Appl. No. 11/097,479, filed Apr. 1, 2005 by Thomas H. James et al.

Non-final Office action dated Dec. 23, 2009 in U.S. Appl. No. 11/219,407, filed Sep. 2, 2005 by Thomas H. James et al.

Non-final Office action dated Dec. 23, 2009 in U.S. Appl. No. 11/219,247, filed Sep. 2, 2005 by Thomas H. James et al.

Non-final Office action dated Jul. 20, 2010 in U.S. Appl. No. 11/810,774, filed Jun. 7, 2007 by Hanno Basse et al.
Non-final Office action dated Jun. 21, 2010 in U.S. Appl. No. 11/219,418, filed Sep. 2, 2005 by Thomas H. James et al.
Final Rejection dated Jun. 21, 2010 in U.S. Appl. No. 11/219,247, filed Sep. 2, 2005 by Thomas H. James et al.
Non-final Office action dated Jul. 20, 2010 in U.S. Appl. No. 11/097,482, filed Apr. 1, 2005 by Thomas H. James et al.
Final Rejection dated Jul. 21, 2010 in U.S. Appl. No. 11/219,407, filed Sep. 2, 2005 by Thomas H. James et al.
European Telecommunications Satellite Organization (EUTELSAT); Digital Satellite Equipment Control (DiSEqC): Application Information for Tuner-Receivers/IRDS; Apr. 12, 1996; pp. 1-25.
Mexican Office action dated Jul. 26, 2010 in Mexican Patent Application No. MX/a/2008/015659 filed Jun. 18, 2007 by Hanno Basse et al.
Non-final Office action dated Aug. 13, 2010 in U.S. Appl. No. 11/820,205, filed Jun. 18, 2007 by Hanno Basse et al.
Non-final Office action dated Jun. 23, 2010 in U.S. Appl. No. 11/820,446, filed Jun. 19, 2007 by Thomas H. James et al.
Chinese Office action dated Jun. 23, 2010 in Chinese Patent Application No. 200780029062.3 filed Jun. 7, 2007 by Hanno Basse et al.
Supplementary European search report dated Jul. 6, 2010 in European Patent Application No. 06749159.7 filed Apr. 3, 2006 by Thomas H. James et al.
EPO Communication dated Jun. 25, 2010 in European Patent Application No. 07815055.4 filed Jun. 7, 2007 by Hanno Basse et al.
Non-final Office action dated Aug. 4, 2010 in U.S. Appl. No. 11/097,480, filed Apr. 1, 2005 by Thomas H. James et al.
Final Rejection dated Jul. 7, 2010 in U.S. Appl. No. 11/097,479, filed Apr. 1, 2005 by Thomas H. James et al.
Notice of Allowance dated Aug. 16, 2010 in U.S. Appl. No. 11/097,723, filed Apr. 1, 2005 by Thomas H. James et al.
Final Rejection dated Mar. 29, 2006 in U.S. Appl. No. 11/097,615, filed Apr. 1, 2005 by Thomas H. James et al.
Notice of Allowance dated Sep. 16, 2010 in U.S. Appl. No. 11/097,625, filed Apr. 1, 2005 by Thomas H. James et al.
Non-final Office action dated Aug. 31, 2010 in U.S. Appl. No. 11/097,615, filed Apr. 1, 2005 by Thomas H. James et al.
EPO supplementary search report and search opinion dated Aug. 19, 2010 in European Patent Application No. 06749155.5 filed Apr. 3, 2006 by Thomas H. James et al.
STMICROELECTRONICS; "Extension of the DiseqC 1 Standard for Control of Satellite Channel Router Based One-Cable LNBs"; Application Note; Oct. 5, 2004; pp. 1-12; XP00239973.
Notice of Allowance dated Dec. 6, 2010 in U.S. Appl. No. 11/097,479, filed Apr. 1, 2005 by Thomas H. James et al.
EPO supplementary search report and search opinion dated Aug. 19, 2010 in European Patent Application No. 06740394.9 filed Apr. 3, 2006 by Thomas H. James et al.
EPO supplementary search report and search opinion dated Aug. 16, 2010 in European Patent Application No. 06749160.5 filed Apr. 3, 2006 by Thomas H. James et al.
Notice of Allowance dated Feb. 2, 2011 in U.S. Appl. No. 11/097,480 filed Apr. 1, 2005 by Thomas H. James et al.
Non-final Office action dated Feb. 18, 2011 in U.S. Appl. No. 12/195,256 filed Aug. 20, 2008 by Robert F. Popoli.
Notice of Allowance dated Jan. 10, 2011 in U.S. Appl. No. 11/097,479 filed Apr. 1, 2005 by Thomas H. James et al.
Final Rejection dated Jan. 31, 2011 in U.S. Appl. No. 11/820,205 filed Jun. 18, 2007 by Hanno Basse et al.
Notice of Allowance dated Feb. 17, 2011 in U.S. Appl. No. 11/097,615 filed Apr. 1, 2005 by Thomas H. James et al.
Notice of Allowance dated Dec. 23, 2010 in U.S. Appl. No. 11/219,418 filed Sep. 2, 2005 by Thomas H. James et al.
Final Rejection dated Jan. 18, 2011 in U.S. Appl. No. 11/097,482 filed Apr. 1, 2005 by Thomas H. James et al.
Final Rejection dated Jan. 12, 2011 in U.S. Appl. No. 11/810,774 filed Jun. 7, 2007 by Hanno Basse et al.
Non-final Office action dated Mar. 15, 2011 in U.S. Appl. No. 11/820,446 filed Jun. 19, 2007 by Thomas H. James et al.

* cited by examiner

DIRECT BROADCAST SIGNAL DISTRIBUTION METHODS

TECHNICAL FIELD

The present invention relates generally to direct broadcast systems, and more particularly to methods and apparatuses for receiving broadcast signals within a direct broadcast system from an outdoor unit.

BACKGROUND OF THE INVENTION

Direct broadcast systems use various orbital slots, which correspond to different services including video and audio programming. Additional new services are continuously being offered for direct satellite broadcast system users. Typically when new services are offered existing direct satellite broadcast system components need to be replaced or altered to accommodate for the new services. The services are broadcasted via radio waves within the direct broadcast system.

Typical direct broadcast systems include a direct broadcast receiver for receiving direct broadcast signals. The direct broadcast receiver includes a low noise block converter (LNB) or a series of individual separate LNBs. The LNB(s) may be directly connected to an integrated receiver and decoder (IRD) or may be connected to a multi-switch followed by one or more IRD(s). The LNB(s) receive, combine, and amplify the direct broadcast signals. A program channel is selected on the IRD(s), which in turn may directly receive a direct broadcast signal having a particular frequency corresponding to the program channel from a particular LNB or may use the multi-switch to switch to a different LNB.

Typically, 32 different frequencies are transmitted on any particular satellite. The satellite splits the frequencies between two polarizations, left hand circularly polarized (LHCP) signals and right hand circularly polarized (RHCP) signals to increase efficiency and allow the frequencies to be packed closer together given a certain amount of bandwidth allocated to each frequency. Use of the RHCP signals and LHCP signals allows for an increased number of frequencies to exist on the same bandwidth and increases capacity of the satellite. Half of the frequencies are assigned to the RHCP signals and the other half of frequencies are assigned to the LHCP signals.

Each LNB can only receive one of the polarizations at any particular time. Thus, a LNB typically receives 16 frequencies at any point in time. Received polarization is determined by a direct current (DC) voltage control mechanism that is applied to an output of the LNB(s). The DC voltage is either +13V or +18V dependent on the polarization desired. Each LNB can then select a desired polarization and convert the satellite signal at approximately 15 GHz and translate it in frequency down to 950-1450 MHz, or a 500 MHz wide signal band. The 500 MHz wide signal band is the signal that is normally fed into the IRD(s). Each IRD then selects one of the 16 frequencies from the input spectrum and one or more channels contained within the chosen frequency.

A site may have multiple IRD(s), typically internal to the customer site, each of which requiring a separate wire to connect to the multi-switch or LNBs. The multi-switch allows multiple IRD(s) to access the entire available spectrum, up to approximately 32 frequencies on each satellite, requiring each tuner to be coupled to the multi-switch with an associated wire. Also, each IRD may have multiple tuners, especially in more advanced IRD(s) that offer advanced consumer features, such as watch and record, picture-in-picture, and independently acquired data feed features. Thus, each tuner requires a designated wire since currently used selection mechanisms are not designed to operate in a shared medium environment. For example, a three-tuner IRD requires three wires. Separate wires are used for two main reasons. First the control mechanism is DC coupled, which can cause interference between tuners that are using a single wire. Second the transmitted signals received by each tuner are at the same frequencies and having the same bandwidths, also causing conflict between signals.

The multiple wires increase the number of required ports on multiple system components and potentially require increased hole size in an exterior wall of a building to accommodate for additional wires between the LNB(s) and the IRD tuners. The multiple wires not only increase installation complexity but also decrease system esthetics.

Also, in order to accommodate system upgrades, such as additional satellite access, advanced modulation schemes, newly introduced frequency spectrums, or other system upgrades, existing IRD(s) are often replaced and system wiring is expanded.

Additionally, existing direct broadcast systems are bandwidth inefficient in that communication signals are distributed from satellites to sites at a larger bandwidth than required or used by a particular site. The larger bandwidth is received by the LNBs and distributed to the IRD(s), which only use a portion of the bandwidth associated with desired customer services.

It would therefore be desirable to minimize the number of wires between LNBs and IRD(s) within a direct broadcast system, thereby potentially minimizing system installation complexity, minimizing system costs, and improving system esthetics. It would also be desirable for the direct broadcast system to support both existing daisy chain wiring and site-run wiring architectures, minimize system adjustments when different satellites or broadcast bands are utilized, and minimize system upgrade costs.

SUMMARY OF THE INVENTION

The present invention has several advantages over existing direct broadcast systems. One advantage of the present invention is that it provides reception by multiple integrated receiver and decoders (IRD)s from an outdoor unit (ODU) via a single distribution cable. Thus, the present invention minimizes cables between the ODU and the IRD(s).

Another advantage of the present invention is that it supports existing daisy chain and site-run wiring architectures as well as accounting for cables having differing bandwidth capability.

Yet another advantage of the present invention is that it accounts for direct broadcast system updates by minimizing the amount of wiring, ODU, and IRD modifications to accommodate the updates.

Moreover, the present invention provides decreased distribution bandwidth from an ODU to IRD(s), thus, allowing for an increased number of IRD(s) per ODU and the ability of utilizing wireless distribution between the ODU and the IRD(s). Additionally, with a reduced amount of bandwidth being utilized by the IRD(s) an increased amount of independent streams of data can be viewed without the need for an additional tuner, as is typically required in prior art direct broadcast systems.

The present invention provides a method and apparatus of receiving a plurality of broadcast signals within a direct broadcast system from an outdoor unit. A direct broadcast system having a high altitude communication device that transmits broadcast signals, which are received by an antenna, is provided. The system includes an ODU electrically coupled to the antenna. The ODU includes a low noise block converter (LNB) that receives and amplifies the broadcast signals. An ODU receiver is electrically coupled to the ODU and selects a desired frequency of the broadcast signals. IRD(s) are electrically coupled to the ODU receiver via a single distribution cable. The IRD(s) convert the broadcast signals into IRD output signals. Methods of performing the same are also provided, herein, including a transport select method and a service select method for receiving the broadcast signals. A direct broadcast system installation method and wireless communication between the ODU and the IRD(s) are also provided.

The present invention itself, together with further objects and attendant advantages, will be best understood by reference to the following detailed description, taken in conjunction with the accompanying drawing.

BRIEF DESCRIPTION OF THE DRAWING

For a more complete understanding of this invention reference should now be had to the embodiments illustrated in greater detail in the accompanying figures and described below by way of example.

DETAILED DESCRIPTION OF THE PREFERRED EMBODIMENT

In each of the following figures, the same reference numerals are used to refer to the same components. While the present invention is described with respect to a method and apparatus for receiving a plurality of broadcast signals within a direct broadcast system from an outdoor unit, the following method is capable of being adapted for various purposes and is not limited to the following applications: direct broadcast systems, cable television networks, communication systems, or other terrestrial communication applications.

In the following figures the same reference numerals are used to refer to the same components. Also in the following description, various operating parameters and components are described for one constructed embodiment. These specific parameters and components are included as examples and are not meant to be limiting.

Also, in the following description the terms "single distribution cable" refer to a single coaxial style cable having an inner and outer conductor. Various coaxial style cables exist and may be utilized such as RG59 cable, RG6 cable, and other coaxial cable known in the art. Non-coaxial style cable may also be used that serves a similar purpose as the coaxial style cable mentioned.

Figure 1:
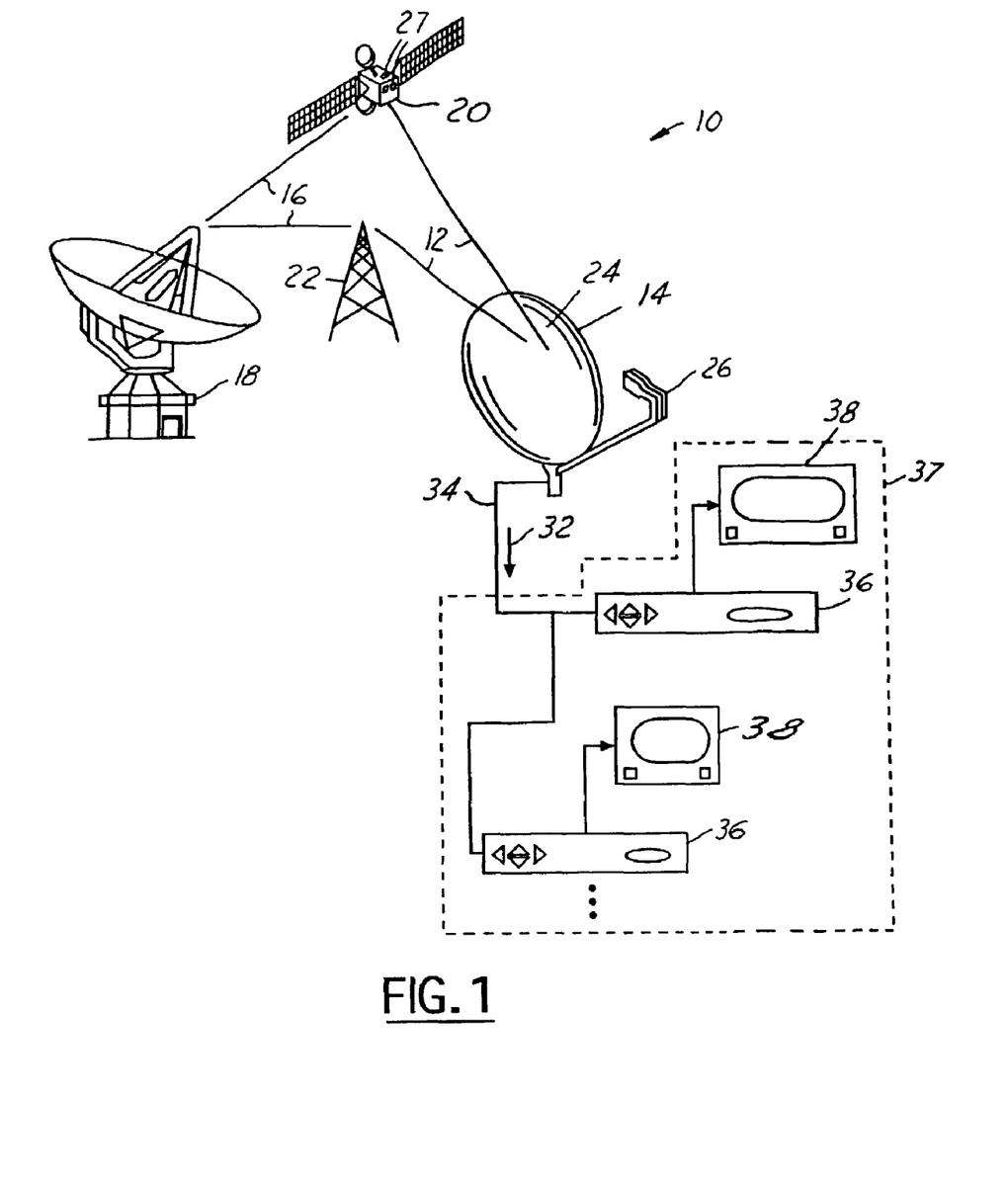
FIG. 1 is a schematic illustration view of a direct broadcast system, utilizing methods and apparatuses for receiving broadcast signals within a direct broadcast system from an outdoor unit in accordance with an embodiment of the present invention.

Referring now to FIG. 1, a perspective view of a direct broadcast system 10, utilizing methods and apparatuses for receiving broadcast signals 12 within the direct broadcast system 10 from an outdoor unit (ODU) 14 in accordance with an embodiment of the present invention is shown. Radio frequency (RF) signals 16 are transmitted at one particular frequency from a ground-based station 18 to at least one high altitude device 20. The at least one device 20 transmits the RF signals 16 at a different frequency forming direct broadcast signals 12. The device 20 may be a satellite, a stratospheric platform or other communication device such as base tower 22. The direct broadcast signals 12 are received by a parabolic antenna 24 with an ODU receiver 26 from multiple transponders 27 within the device 20. Each transponder 27 transmits at a different frequency and each frequency is assigned to multiple customer services. The parabolic antenna 24 focuses the direct broadcast signals 12 to an ODU 14 located at a focal point of the antenna 24. The ODU 14 receives the direct broadcast signals 12 via a selection receiver 26. The selection receiver 26 converts the direct broadcast signals 12 into distribution signals or ODU receiver output signals 32, which are transferred by a single distribution cable 34 to integrated receivers and decoders (IRD(s)) 36 within a customer site 37. The IRD(s) 36 decode the programming on the output signals 32 for audio and visual display on one or more communication devices 38. The output signals 32 contain audio and video programming as well as data provided in direct broadcast transmission. Although, there is a given number of direct broadcast system devices shown, various numbers of devices may be utilized.

Figure 2:
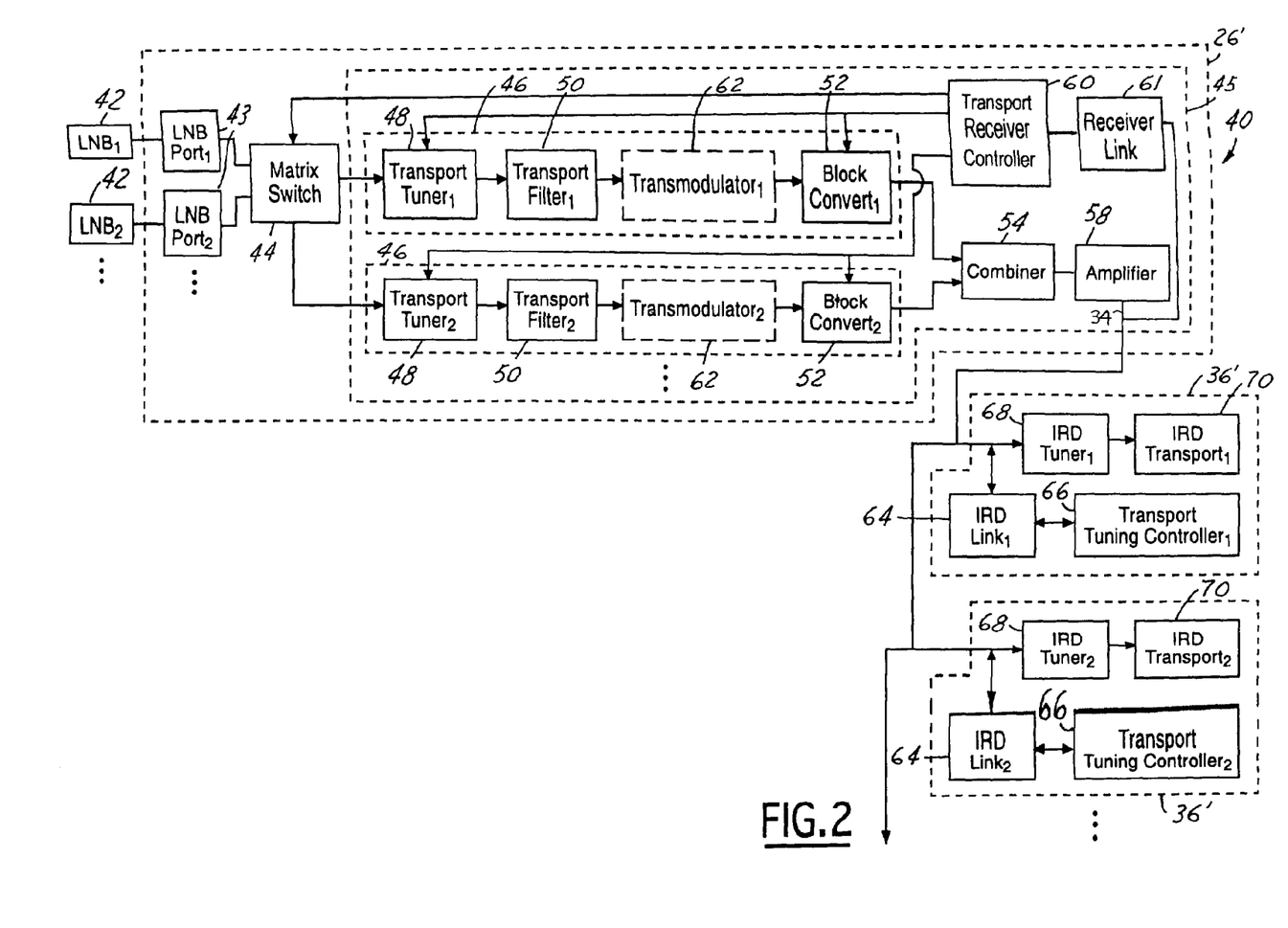
FIG. 2 is a block diagrammatic and schematic view of a transport select system in accordance with a preferred embodiment of the present invention.

Referring now to FIG. 2, a block diagrammatic and schematic view of a transport select system 40 in accordance with an embodiment of the present invention is shown. A transport ODU receiver 26' is electrically coupled to multiple IRD(s) 36' via the distribution cable 34. The transport receiver 26' is electrically coupled to multiple low noise block converters (LNBs) 42, via LNB ports 43, that receive the broadcast signals 12 from the transponders 27 having dual polarizations. For example, the device 20 may have 32 transponders, half of which are assigned to right-hand circular polarized (RHCP) signals and the other half assigned to left-hand circular polarized (LHCP) signals. Each LNB 42 receives polarized signals from determined transponders 27 at particular frequencies. Each LNB receives either a RHCP signal or a LHCP signal. The bandwidth of the broadcast signals may be 500 MHz, such that the transport select unit frequency ranges are approximately between 950-1450 MHz.

The LNBs 42 are electrically coupled to a transport LNB selector 45 via a matrix switch 44. The transport LNBs elector 45 includes multiple transport select units 46, which are electrically coupled to the matrix switch 44. Each select unit 46 includes a transport tuner 48, a transport filter 50, and a block converter 52, which convert the broadcast signals into transport select unit output signals. The tuners 48 select a frequency received from the LNBs 42. For example, a particular LNB of interest may receive broadcast signals on 16 different frequencies, corresponding to a single polarization, and the tuners, that are switched to the LNB of interest, select broadcast signals on one of the 16 frequencies. The filters 50 aid the tuners 48 in filtering out unselected frequencies. The filters 50 may be an integral portion of the tuners 48 or may be separate devices as shown. The block converters 52 shift the broadcast signals at the selected frequency to a transport select unit frequency. A combiner 54 is electrically coupled to the block converters 52 and combines transport select unit output signals to form the ODU receiver output signal. The ODU receiver output signal is then amplified by the amplifier 58 before being received by the IRD(s) 36'.

The transport tuners 48 may combine demodulation and remodulation characteristics to reduce channel bandwidth of distributed signals. For example, a nominal satellite modulation scheme of QPSK at 27 MHz to carry 30 Mbps to 64 QAM can reduce bandwidth per channel to 4 MHz, thus increasing number of allowable IRD(s) per ODU receiver.

The frequencies distributed between the receiver 26' and the IRD(s) 36' may be configured to co-exist with other baseband frequencies such as phone, various types of digital subscriber line (xDSL), cable modem, or other broadband applications.

The transport LNB selector 45 also includes a transport receiver controller 60. The transport receiver controller 60 is electrically coupled to the matrix switch 44, the tuners 48, and the block converters 52. The transport receiver controller 60 is preferably microprocessor-based such as a computer having a central processing unit, memory (RAM and/or ROM), and associated input and output buses. The transport receiver controller 60 may be an integral part of a central unit, as shown, or may be a separate stand-alone device. The transport receiver controller 60 receives a content request signal from the IRD(s) 36' via a receiver link 61, and signals the matrix switch 44, the tuners 48, and the block converters 52 to perform accordingly.

The transport receiver controller 60 may also store capabilities of the LNBs 42 in order to switch between the LNBs 42. Alternatively, the LNBs 42 may be pre-assigned and hardwired to the LNB ports 43.

A transmodulator 62 may be electrically coupled between the filters 50 and the block converters 52 to alter modulation of the broadcast signals. The broadcast signals are transmitted at a predetermined modulation rate, whereby a determined amount of data is transmitted for a first bandwidth. In altering the modulation rate the determined amount of data is transferred for a second bandwidth which is smaller than the first bandwidth. Thus, decreasing the amount of bandwidth used for a given amount of data.

Additionally, due to the configuration of the present invention more than one IRD may utilize a single tuner. When a first IRD is requesting a service that is on a frequency as that of a second service for which a second IRD is requesting, each IRD may utilize the same tuner. The ability to share tuners and receiver resources is unlike that of prior art broadcast systems. The present invention thus can provide an increased number of resources that may be used by an individual IRD, than is normally cost effective to incorporate into an individual IRD.

In overview, the selection receiver 26' receives, transmodulates, and converts the dual polarized broadcast signals into the ODU receiver output signal, which utilizes a smaller amount of bandwidth to allow for use of the distribution cable 34 and for an increased number of IRD(s) over prior art systems. The present invention allows for multiple distribution signals to exist on the distribution cable 34, unlike that of the prior art in which each distribution cable has a single distribution signal.

The IRD(s) 36' are capable of determining the capabilities of the receiver and performing appropriate configuration adjustments. The IRD(s) 36' include multiple IRD links 64, which are electrically coupled to transport-tuning controllers 66. A service is selected by the transport-tuning controllers 66, which generate content request signals. Multiple IRD tuners 68, which are electrically coupled to the amplifier 58 via the distribution cable 34, receive and select the ODU receiver output signals at desired frequencies in response to the content request signals. Multiple IRD transports 70 are also electrically coupled to the IRD tuners 68 and convert the ODU receiver output signals into audio or video format for a particular communication device 38, as known in the art.

In order for the multiple tuners 48 and the multiple IRD(s) 36' to select signal content over shared media, a communication protocol is used. To accomplish the communication protocol, the receiver link 61 and the IRD links 64 may be in the form of broadband Ethernet interfaces or other interface devices known in the art. The IRD(s) 36' may diagnose and indicate, via the monitors 38, any pointing errors or hardware misconfigurations.

Figure 6:
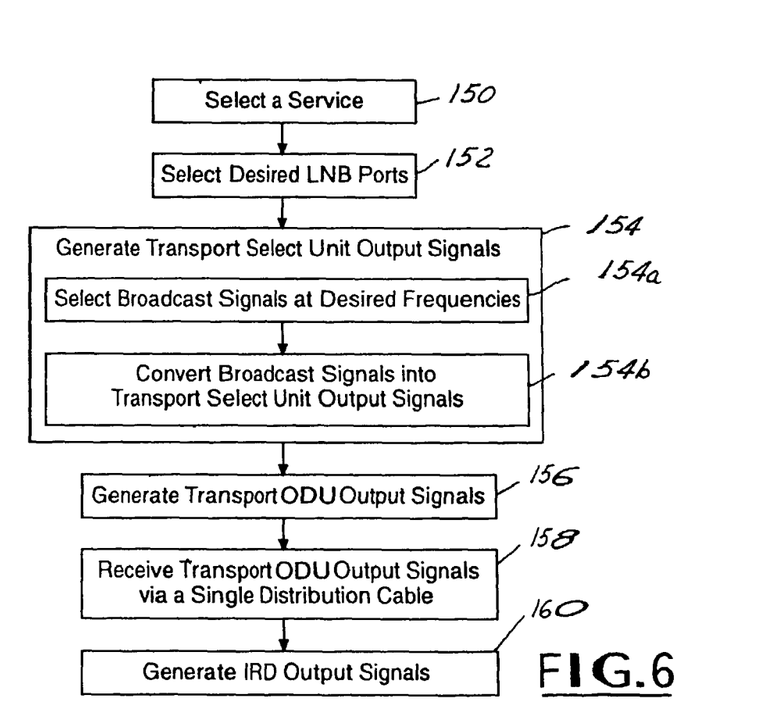
FIG. 6 is a logic flow diagram illustrating a transport select method for the transport select system in accordance with a preferred embodiment of the present invention.

The operation of the transport receiver 26' and the transport IRD(s) 36' is explained in further detail below and is illustrated in FIG. 6.

Figure 3:
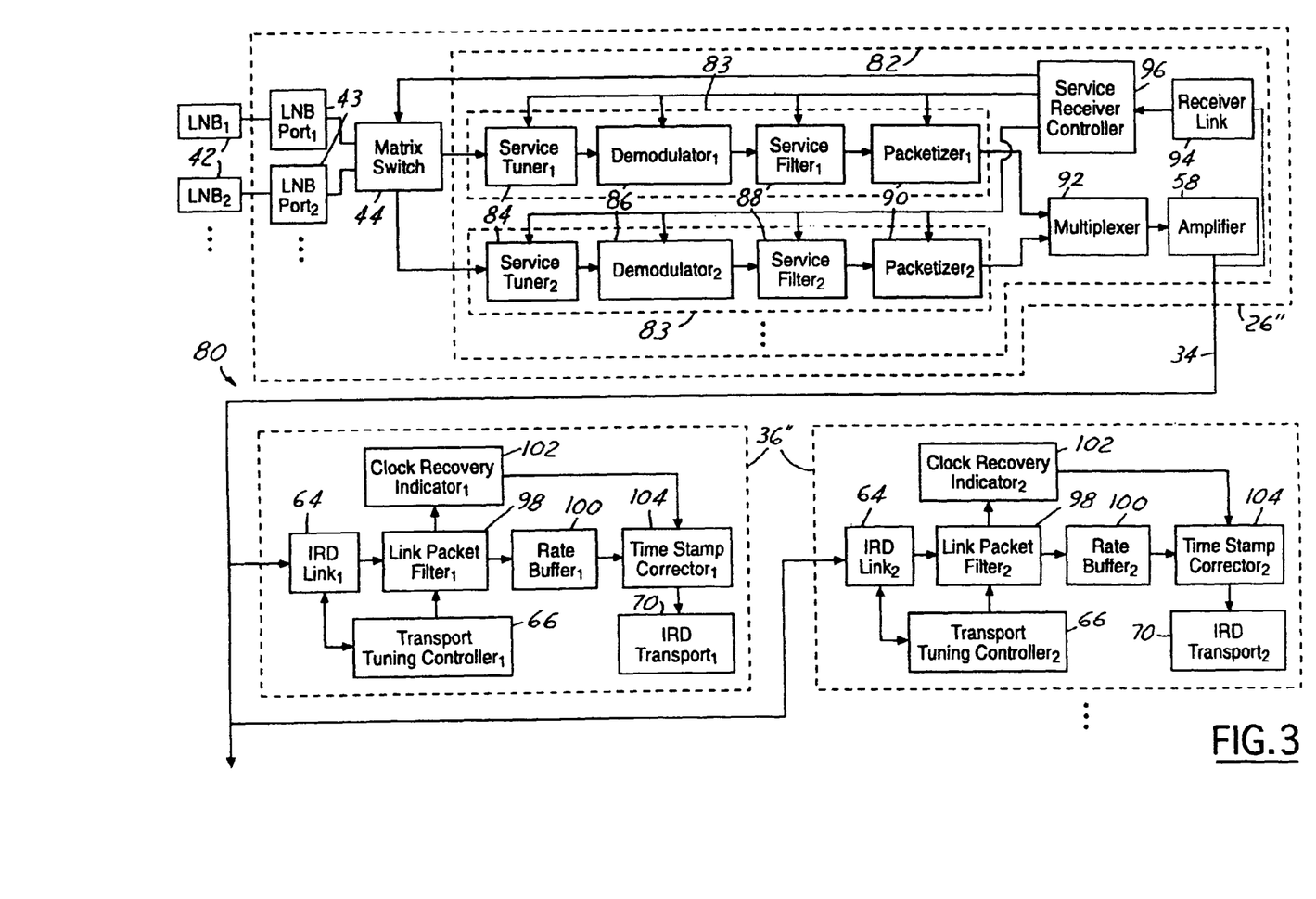
FIG. 3 is a block diagrammatic and schematic view of service select system in accordance with a preferred embodiment of the present invention.

Referring now to FIG. 3, a block diagrammatic and schematic view of a service select system 80 in accordance with an embodiment of the present invention is shown. The system 80 includes a service ODU receiver 26" and multiple IRD(s) 36". The service receiver 26" includes a service LNB selector 82 that is electrically coupled to the LNB 42 via the matrix switch 44. Unlike the transport LNB selector 43, the service LNB selector 82 generates service receiver output signals that contain selected channel signals for a selected service without other channel signals for unselected service on the same associated frequency. An associated frequency may contain numerous channel signals for various services. Each service has corresponding channel signals. When services are selected on the IRD(s) 36" the service LNB selector 82 provides the IRD(s) 36" with channel signals that correspond to the selected service without other channel signals that may be on the associated frequencies as the selected services.

The service LNB selector 82 includes service select units 83, a multiplexer 92, and a service receiver controller 96. The select units 83 select channels that correspond to selected services for transfer to the service IRD(s) 36". The multiplexer 92 is electrically coupled to the select units 83 and multiplexes service select unit output signals in time to generate the service receiver output signals. An amplifier 58 is electrically coupled to the multiplexer 92 and the service IRD(s) 36". The service select unit output signals are amplified before being received by the service IRD(s) 36". A receiver link 94 is electrically coupled to the service IRD(s) 36" and performs similarly to the receiver link 61.

The service receiver controller 96 is electrically coupled to the receiver link 94, the service tuners 84, the demodulators 86, the service filters 88, and the packetizers 90. The service receiver controller 96 operates the service tuners 84, the demodulators 86, the service filters 88, and the packetizers 90 in response to the content request signal. The service receiver controller 96 as with the transport receiver controller 60 is preferably microprocessor-based such as a computer having a central processing unit, memory (RAM and/or ROM), and associated input and output buses. The service receiver controller 96 may also be an integral part of a central unit, as shown, or, alternatively, may be a separate stand-alone device.

The service select units 83 include a service tuner 84, a demodulator 86, a service filter 88, and a packetizer 90. The service tuner 84 performs similarly as that of the transport tuner 48 in that it selects an associated frequency for a requested service. The demodulator 86 removes transmission modulation of the broadcast signals such as quaternary phase shift keying, quadrature amplitude modulation, and other forms of modulation known in the art. Unlike the transport filters 50 that select a frequency out of the above mentioned 16 frequencies, the service filters 88 demultiplex a selected frequency to select one or more channels out of approximately 10 channels contained therein. The packetizers 90 group channels corresponding with a selected service. For example, a selected service may have an associated audio channel, video channel, and data channel, which are combined to form the selected service.

The service select units further decrease distribution bandwidth between the service receiver 26" and the IRD 36" by efficient use of bandwidth. Bandwidth use is further reduced over the transport select system 40 by utilizing a reduced amount of bandwidth to distribute channels that correspond with a request service and not distributing channels that may correspond with a desired frequency from an LNB but do not correspond with a requested service.

The service IRD 36" include IRD links 64 and transport tuning controllers 66. Link packet filters 98 are electrically coupled to the IRD links 64 and select appropriate packets for selected services, on the transport-tuning controllers 66, corresponding to associated IRD(s) 36". A rate buffer 100 is electrically coupled to the link packet filters 98 and determines timing for the associated IRD(s) 36" and adjusts link packet filter output signals appropriately. A clock recovery indicator 102 is electrically coupled to the link packet filters 98. When channels are shifted in time for multiplexing and linking purposes, the clock recovery indicator 102 signals a time stamp corrector 104, which is electrically coupled to the rate buffer 100, to undo what the multiplexer 90 or the links 64 and 94 have done. The time stamp correctors 104 are electrically coupled to the IRD transports 70. It will be appreciated that the IRD(s) 36" do not include an IRD tuner but instead include broadband link circuitry such as the packet filters 98, buffer 100, indicator 102, and the corrector 104. The broadband link circuitry allows for use of a single link and flexibility to receive as many services as an IRD is capable of receiving.

Figure 7:
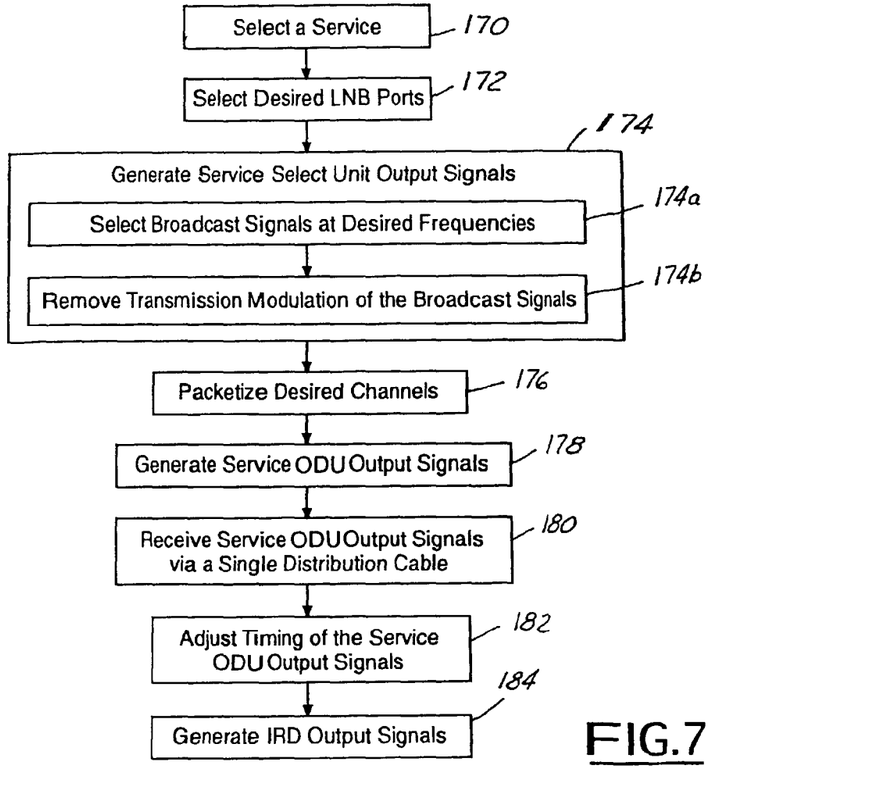
FIG. 7 is a logic flow diagram illustrating a service select method for the service select system in accordance with a preferred embodiment of the present invention.

The operation of the service receiver 26" and the service IRD(s) 36" is explained in further detail below and is illustrated in FIG. 7.

Demodulation is performed by the service receiver 26" and not within the service IRD 36" allowing for easy upgrade capability. Upgrades may be performed by simply adjusting or replacing the receiver 26" without modification to the existing IRD(s) 36".

Figure 4:
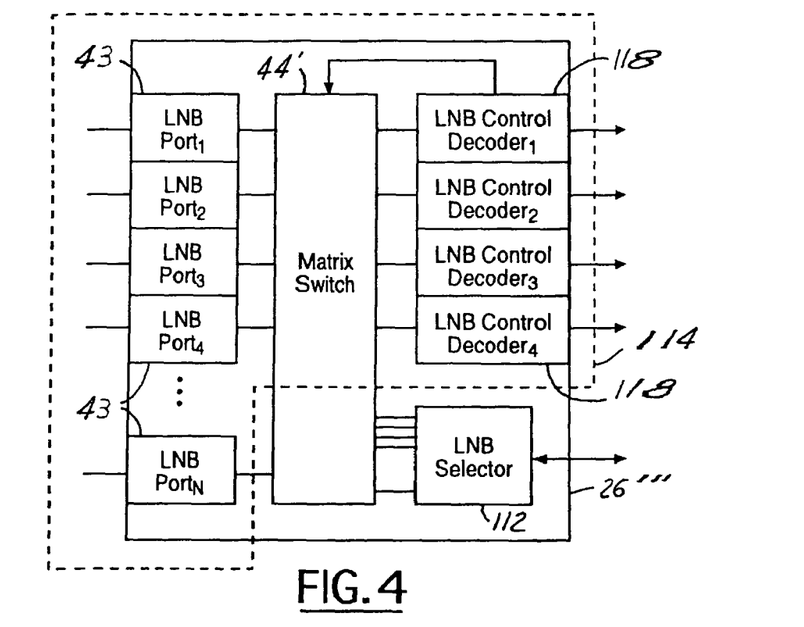
FIG. 4 is a block diagrammatic and schematic view of an ODU receiver integrating a standard multi-switch in accordance with a preferred embodiment of the present invention.

Referring now to FIG. 4, a block diagrammatic and schematic view of an ODU receiver 26''' integrating a standard multi-switch 110 in accordance with an embodiment of the present invention is shown. The receiver 26''' illustrates integration of an LNB selector 112, which may be either the transport LNB selector 45 or the service LNB selector 82, into a conventional multi-switch 114 for support of existing direct broadcast systems. The receiver 26''' allows conventional style IRD(s) to be combined with IRD(s) of the present invention such as IRD(s) 36' or 36", that use the transport select methods and service select methods, which are described in detail below.

The conventional multi-switch 114 has multiple LNB ports 43, a matrix switch 44', and LNB control decoders 118. The LNB control decoders 118 select LNBs 36" by using tone and/or voltage decoding methods known in the art. The matrix switch 44 is formed to accommodate both the LNB control decoders 118 and the LNB selector 112.

Figure 5:
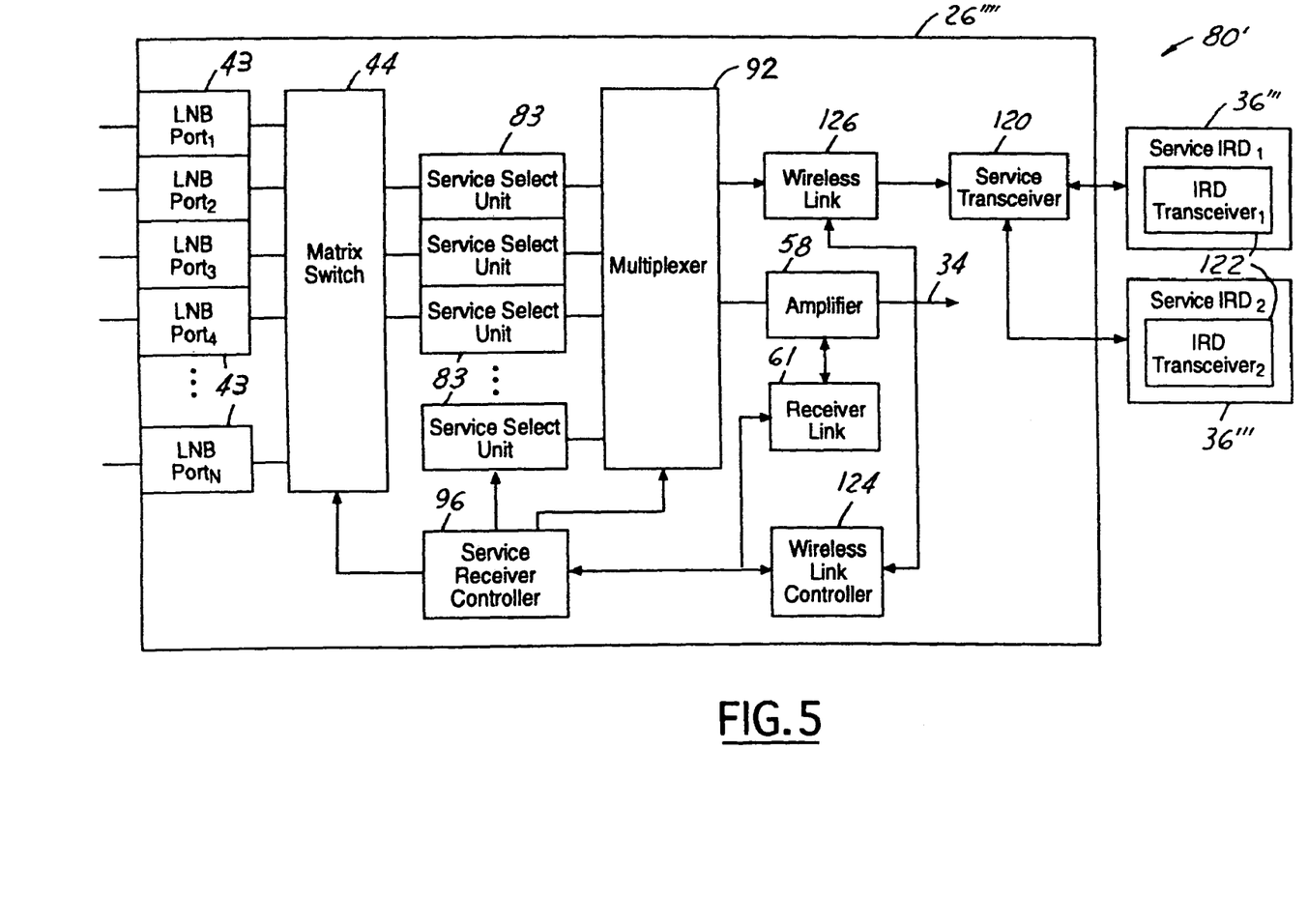
FIG. 5 is a block diagrammatic and schematic view of a direct broadcast receiver of the service select system for wireless communication in accordance with a preferred embodiment of the present invention.

Referring now to FIG. 5, a block diagrammatic and schematic view of a service receiver 26"" of the service select system 80' for wireless communication in accordance with an embodiment of the present invention is shown. Since the service select system 80' significantly decreases the amount of signal bandwidth being utilized in the distribution of service receiver output signals from the service receiver 26"" to service IRD(s) 36''', wireless communication is feasible between the service receiver 26"" and the service IRD(s) 36'''. The service select system 80', as shown, accommodates for both wired and wireless communication between the service receiver 26"" and the IRD(s) 36'''. Of course, the system 80' may be altered to accommodate only wireless communication.

For wireless communication the service receiver 26"" and the service IRD(s) 36''' include a service transceiver 120 and an IRD transceiver 122, respectively. A wireless link controller 124 is electrically coupled between the service receiver controller 96 and a wireless link 126, which is electrically coupled to the service transceiver 120.

The wireless link controller 124 determines transmit and receive timing of the wireless link 126. Signals may be transmitted between the service receiver 26"" and the service IRD(s) 36''' synchronously or sequentially, which is determined by the wireless link controller 124. The wireless link controller 124 may also be microprocessor-based such as a computer having a central processing unit, memory (RAM and/or ROM), and associated input and output buses. The wireless link controller 124 may also be an integral part of a central unit or, instead, may be a separate stand-alone device.

Although, wireless communication is described above for the service select system 80 it is also feasible and may be applied to the transport select system 40 or to other embodiments of the present invention.

The above-described system components and devices may be hardware based or software based when appropriate and depending upon the application.

Referring now to FIG. 6, a logic flow diagram illustrating a transport select method for the transport select system 40 in accordance with an embodiment of the present invention is shown.

A service is selected on the transport-tuning controllers 66 and the transport-tuning controllers 66 generate the content request signals, as generally indicated by step 150. The content request signals are received by the transport receiver controller 60 via the IRD links 64 and the receiver link 61.

The transport receiver controller 60 operates the matrix switch 44 and the transport select units 46 in order to select desired LNB ports 43 in response to the content request signals corresponding to frequencies that are associated with the selected services, as generally indicated by step 152. The transport receiver controller 60 determines which transponders 27 are associated with the selected services and operates the matrix switch 44 and the transport select units 46 such that the appropriate LNB(s) 42 are in communication with the appropriate transport select units 46. The transport select units 46 then receive the associated frequencies assigned to the selected services.

The transport select units 46 generate transport select unit output signals in response to broadcast signals received from the desired LNB ports 43, as generally indicated by step 154.

The transport tuners 48 in combination with the transport filters 50 select broadcast signals at desired frequencies, as generally indicated by step 154a.

The block converters 52 convert the broadcast signals at the desired frequencies into the transport select unit output signals, as generally indicated by step 154b. The block converters 52, within the assigned transport select units 46 then shift the broadcast signals on the associated frequencies to transport select unit frequencies.

The combiner 54 combines the transport select unit output signals to generate the transport ODU output signals, as generally indicated by step 156.

The IRD tuners 68 receive the transport ODU output signals via the distribution cable 34, as generally indicated by step 158, and select a desired transport ODU output signal corresponding to a selected service.

The IRD transports 70 upon receiving the ODU output signals prepares the transport ODU output signals for listening or viewing on the monitors 38, by generating IRD output signals, as generally indicated by step 160.

Referring now to FIG. 7, a logic flow diagram illustrating a service select method for the service select system 80 in accordance with an embodiment of the present invention is shown.

The transport-tuning controllers 66 generate the content request signals as in step 150 above and as generally indicated by step 170.

The service receiver controller 96 selects desired LNB ports 43 in response to the content request signals, as generally indicated by step 172. Similar to the transport receiver controller 60, the service receiver controller 96 operates the matrix switch 44 and the service select units 83 to assure that appropriate LNB 42 are in communication with appropriate service select units 83.

The service select units 83 select channels associated with the desired LNB ports and the selected services and generates the service select unit output signals, as generally indicated by step 174.

The service tuners 84 and the service filters 88, as with the transport tuners 48 and transport filters 50, select broadcast signals at desired frequencies in response to the service select signals, as generally indicated by step 174a. The service filters 88 receive a service channel identifier (SCID) list so as to filter out SCID numbers that do not correspond with channels of selected services.

The demodulators 86 remove transmission modulation of the broadcast signals, as stated above and as generally indicated by step 174b.

The packetizers 90 packetize the desired channels in response to the service select signals, as generally indicated by step 176. Packets that were initially transported via the broadcast signals are wrapped within another packet to be received over the distribution cable or via wireless communication. An identifier is added to each packet so that the IRD(s) 36" are able to de-multiplex the packets. In one embodiment of the present invention, real time stream carrying frequencies or channels are unidirectional to minimize signal collisions. Other non-real time stream carrying frequencies may be separate multiple access channels.

The multiplexer 92 multiplexes the service select unit output signals to generate the service ODU output signals, as generally indicated by step 178.

The link packet filters 98 receive the service ODU output signals via the distribution cable 34 and links 61 and 64, as generally indicated by step 180.

The rate buffer 100, the clock recovery indicator 102, and the time stamp corrector 104 adjust timing of the service ODU output signals to generate corrected output signals and to account for the multiplexing within the service receiver 26", as generally indicated by step 182.

The IRD transports 70 upon receiving the correct output signals prepare the corrected output signals for listening or viewing on the monitors 38, by generating IRD output signals, similar to step 160 and as generally indicated by step 184.

Figure 8:
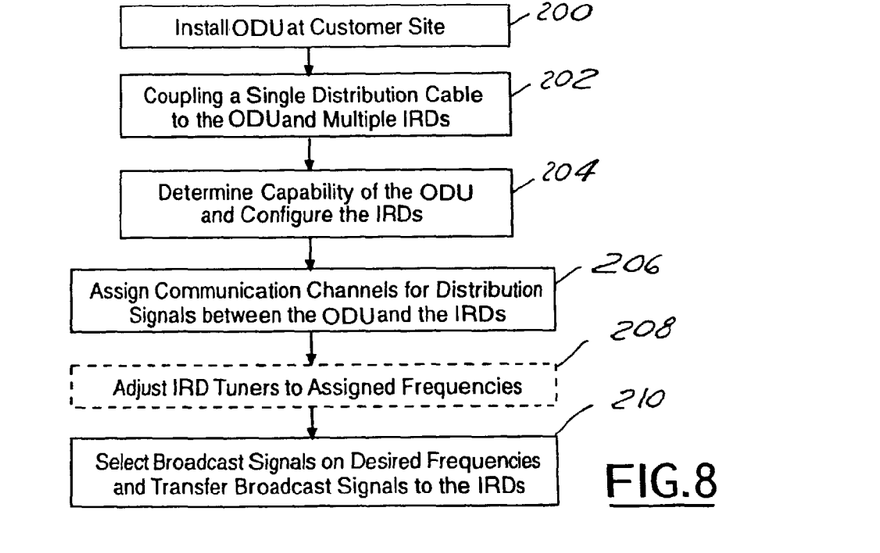
FIG. 8 is a logic flow diagram illustrating a direct broadcast system installation method in accordance with a preferred embodiment of the present invention.

Referring now to FIG. 8, a logic flow diagram illustrating a direct broadcast system installation method in accordance with an embodiment of the present invention is shown. The ODU 14 is installed at a customer site 37, as generally indicated by step 200. The distribution cable 34 is coupled to the ODU 14 and to the IRD(s) 36, as generally indicated by step 202. The IRD(s) 36 generate ODU capability request signals to determine capability of the ODU 14, as generally indicated by step 204. The IRD(s) 36 are configured in response to the ODU capability request signal. The IRD(s) 36 utilize the ODU capability request signal for future tuning requests of the ODU 14.

The ODU 14 allocates and assign communication channels or frequencies for distribution of signals between the ODU 14 and the IRD(s) 36, as generally indicated by step 206. For the transport select system 40, the IRD tuners 68 then adjust to the assigned frequencies, as generally indicated by step 208. The ODU 14 selects broadcast signals on desired frequencies, corresponding to selected services, and transfers the broadcast signals to the IRD(s) 36 on the assigned channels, as generally indicated by step 210.

The above-described steps are meant only to be an illustrative example. It will be understood that the steps may be performed synchronously or in a different order depending upon the application.

The present invention provides a method of receiving a plurality of broadcast signals from an ODU within a direct broadcast system that supports various wiring topologies. The present invention reduces bandwidth of transmission of distributed signals between an ODU and multiple IRD(s). In an end-to-end system sense, the present invention reduces cost and increases functionality. An IRD has an increased number of tuner resources due to the pooling of IRD resources. Also, system upgrades may occur at the ODU without having to change IRD(s) or existing wiring that is internal to a customer site.

The above-described method, to one skilled in the art, is capable of being adapted for various purposes and is not limited to the following applications: direct broadcast systems, cable television networks, communication systems, or other terrestrial communication applications. The above-described invention may also be varied without deviating from the true scope of the invention.

What is claimed is:

1. A direct broadcast system having a high altitude communication device for transmitting a plurality of broadcast signals and an antenna for receiving said plurality of broadcast signals, said direct broadcast system comprising:

an outdoor unit (ODU) electrically coupled to said antenna and comprising at least one low noise block converter (LNB) for receiving and amplifying said broadcast signals;

an ODU receiver electrically coupled to said ODU and operable to select a desired frequency of said broadcast signals; and a plurality of integrated receiver and decoders (IRD(s)) communicating with the ODU receiver via a bidirectional wireless link, wherein each IRD in said plurality of IRD(s) requests an individual Service Channel Identifier (SCID) in a wireless fashion and each IRD in the plurality of IRDs receives only the requested SCID on a unique communications channel assigned to each requesting IRD and converts only the requested SCID requested by that IRD into IRD output signals at said desired frequency.

2. A system as in claim 1, wherein said plurality of IRD(s) comprises at least one IRD tuner, and said at least one IRD tuner is adapted for wireless communication with said at least one LNB via said wireless link.

3. A system as in claim 2, wherein said at least one IRD tuner is operable to transmit at least one content request signal to said ODU, which is operable to generate at least one LNB adjustment signal in response to said at least one content request signal.

4. A system as in claim 1, wherein said ODU receiver comprises:
a plurality of LNB ports electrically coupled to said at least one LNB;
a matrix switch electrically coupled to said plurality of LNB ports and operable to select at least one desired LNB port;
at least one LNB selector electrically coupled to said matrix switch and operable to select at least one frequency associated with said at least one desired LNB port and generate at least one transport select output signal;
a combiner electrically coupled to said at least one LNB selector and operable to combine said at least one transport select output signals so as to generate an LNB selector output signal; and
a receiver controller electrically coupled to said matrix switch and said at least one LNB selector for operating said matrix switch and said at least one LNB selector in response to at least one content request signal.

5. A system as in claim 4, wherein said at least one LNB selector comprises:
a transport tuner electrically coupled to said matrix switch and operable to select a desired frequency;
a filter electrically coupled to said transport tuner and operable to filter broadcast signals at said desired frequency; and
a block converter electrically coupled to said filter and operable to convert said desired frequency into an LNB selector frequency.

6. A system as in claim 1, wherein said plurality of IRD(s) comprise:
a transport-tuning controller for generating a content request signal in response to a customer request;
an IRD transceiver electrically coupled to said transport-tuning controller and operable to transmit said content request signal to an LNB selector;
an IRD tuner for receiving receiver output signals in response to said IRD transceiver transmission; and
an IRD transport electrically coupled to said IRD tuner and operable to convert said receiver output signals into said IRD output signals.

7. A system as in claim 1, wherein said ODU receiver comprises at least one tuner, and wherein a first IRD utilizes a tuner of said at least one tuner that is utilized by a second IRD.

8. A system as in claim 1, wherein said ODU further comprises a multi-switch including:
a plurality of LNB ports;
a matrix switch electrically coupled to said plurality of LNB ports and operable to select at least one LNB port of said plurality of LNB ports;
at least one LNB control decoder port electrically coupled to said matrix switch and operable to decode content request signals; and
an LNB selector electrically coupled to said matrix switch and operable to select a desired frequency of said broadcast signals.

9. A system as in claim 1, wherein said ODU further comprises a transmodulator for reducing bandwidth of at least one of said broadcast signals over said wireless link.

10. A system as in claim 1, wherein said ODU receiver comprises:
a plurality of LNB ports electrically coupled to said at least one LNB;
a matrix switch electrically coupled to said plurality of LNB ports for selecting at least one desired LNB port;
at least one LNB selector for selecting at least one channel associated with said at least one desired LNB port and generating at least one service select unit output signal;
a multiplexer for combining said at least one service select unit output signals to generate a receiver output signal; and
a receiver controller for operating said matrix switch and said LNB selector in response to at least one content request signal.

11. A system as in claim 10, said system comprising:
a service transceiver electrically coupled to said LNBs; and
an IRD transceiver for transmitting and receiving said broadcast signals to and from said service transceiver;
wherein said plurality of IRD(s) are electrically coupled to said IRD transceiver and operable to convert said broadcast signals into said IRD output signals.

12. A system as in claim 10, wherein said at least one LNB selector comprises:
a service tuner electrically coupled to said matrix switch and operable to select a desired frequency in response to said content request signal;
a demodulator electrically coupled to said service tuner and operable to remove a transmission modulation from at least a portion of said broadcast signals so as to form demodulated broadcast signals;
a transport filter electrically coupled to said demodulator and operable to filter said demodulated broadcast signals at said desired frequency; and
a packetizer electrically coupled to said transport filter and operable to packetize at least one channel associated with said desired frequency.

13. A system as in claim 10, wherein said plurality of IRD(s) comprise:
a transport-tuning controller for generating a content request signal in response to a customer request;
an IRD transceiver electrically coupled to said transport-tuning controller and operable to transmit said content request signal to said LNB selector;
a link packet filter for receiving receiver output signals in response to said IRD transceiver transmission;
a rate buffer electrically coupled to said h k packet filter and operable to determine timing of an IRD of said plurality of IRD(s);
a clock recovery indicator electrically coupled to said rate buffer and operable to generate a clock recovery signal in response to said receiver output signals;
a time stamp correction device electrically coupled to said rate buffer and operable to correct timing of said receiver output signals so as to generate corrected output signals; and a transport unit electrically coupled to said time stamp correction device and operable to convert said corrected output signals into said IRD output signals.

14. A system as in claim 1, wherein said ODU receiver is integrated within said ODU.

15. A direct broadcast system having a high altitude communication device for transmitting a plurality of broadcast signals and an antenna for receiving said plurality of broadcast signals, said direct broadcast system comprising:
- an ODU electrically coupled to said antenna and comprising at least one LNB for receiving and amplifying said broadcast signals;
- an ODU receiver electrically coupled to said ODU and operable to select a desired frequency of said broadcast signals;
- a service transceiver electrically coupled to said ODU receiver;
- an IRD transceiver for wirelessly transmitting and receiving said broadcast signals to said service transceiver and receiving the broadcast signals from the service transceiver; and
- a plurality of IRD(s) electrically coupled to said IRD transceiver, wherein each IRD in said plurality of IRD(s) requests an individual Service Channel Identifier (SCID) in a wireless fashion and each IRD in the plurality of IRDs receives only the requested SCID on a unique communications channel assigned to each requesting IRD and converts only the SCID requested by that IRD into IRD output signals at said desired frequency.

16. A system as in claim 15, said system comprising:
- a wireless link coupled to said service transceiver for interfacing said plurality of IRD(s) with said ODU receiver; and
- a wireless link controller coupled to said wireless link and operable to determine transmit and receive timing of said wireless link.

17. A direct broadcast system installation method for a direct broadcast system, said method comprising:
- wirelessly coupling an Outdoor Unit (ODU) to a plurality of receivers such that wireless communications occurs between the ODU and the plurality of receivers in a bidirectional manner;
- generating ODU capability request signals to determine capability of the ODU;
- configuring said plurality of receivers in response to said ODU capability request signal;
- allocating and uniquely assigning communication channels for distribution of signals between said ODU and each receiver in said plurality of receivers;
- selecting a requested subset of broadcast signals each on desired frequencies corresponding to selected services; and
- transferring said broadcast signals to each receiver in said plurality of receivers on said uniquely assigned channels, wherein each receiver in the plurality of receivers wirelessly receives only the subset of the broadcast signals requested by the requesting receiver on the uniquely assigned communication channel for that receiver.

18. A method as in claim 17, wherein the step of wirelessly coupling said ODU to a plurality of IRD(s) is accomplished with at least one transceiver and a wireless link.

* * * * *